United States Patent
Tham et al.

(10) Patent No.: US 10,189,082 B2
(45) Date of Patent: Jan. 29, 2019

(54) TURBINE SHROUD WITH ABRADABLE LAYER HAVING DIMPLED FORWARD ZONE

(71) Applicant: Siemens Aktiengesellschaft, München (DE)

(72) Inventors: Kok-Mun Tham, Oviedo, FL (US); Ching-Pang Lee, Cincinnati, OH (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/548,440

(22) PCT Filed: Dec. 9, 2015

(86) PCT No.: PCT/US2015/064615
§ 371 (c)(1),
(2) Date: Aug. 3, 2017

(87) PCT Pub. No.: WO2016/133582
PCT Pub. Date: Aug. 25, 2016

(65) Prior Publication Data
US 2017/0370241 A1 Dec. 28, 2017

Related U.S. Application Data

(63) Continuation of application No. PCT/US2015/016315, filed on Feb. 18, 2015, which
(Continued)

(51) Int. Cl.
*F01D 11/08* (2006.01)
*F01D 11/12* (2006.01)
(Continued)

(52) U.S. Cl.
CPC ............... *B22D 25/02* (2013.01); *B22C 7/02* (2013.01); *B22C 9/24* (2013.01); *B22D 29/001* (2013.01);
(Continued)

(58) Field of Classification Search
CPC ...... F04D 29/685; F04D 29/681; F04D 29/68; F04D 29/526; F04D 29/164;
(Continued)

(56) References Cited

U.S. PATENT DOCUMENTS 1,061,206 A 5/1913 Nikola
3,867,061 A 2/1975 Moskowitz
(Continued)

FOREIGN PATENT DOCUMENTS

DE 2612210 B1 9/1977
DE 4238369 A1 5/1994
(Continued)

OTHER PUBLICATIONS

PCT International Search Report and Written Opinion dated Apr. 8, 2016 corresponding to PCT Application No. PCT/US2015/064615 filed Dec. 9, 2015.

*Primary Examiner* — Justin Seabe
*Assistant Examiner* — Joshua R Beebe

(57) ABSTRACT

Turbine and compressor casing abradable components for turbine engines include abradable surfaces with a zonal system of forward (zone A) and rear or aft sections (zone B) surface features. The zone A surface profile comprises an array pattern of non-directional depression dimples, or upwardly projecting dimples, or both, in the abradable surface. The dimpled forward zone A surface features reduce surface solidity in a controlled manner, to help increase abradability during blade tip rubbing incidents, yet they provide sufficient material to resist incoming hot working (Continued)

fluid erosion of the abradable surface. In addition, the dimples provide generic forward section aerodynamic profiling to the abradable surface, compatible with different blade airfoil-camber profiles. The aft zone B surface features comprise an array pattern of ridges and grooves.

16 Claims, 22 Drawing Sheets

Related U.S. Application Data is a continuation of application No. PCT/US2015/016271, filed on Feb. 18, 2015.

(51) Int. Cl.

| | |
|---|---|
| *F04D 29/68* | (2006.01) |
| *B22D 25/02* | (2006.01) |
| *F01D 5/18* | (2006.01) |
| *C23C 4/02* | (2006.01) |
| *C23C 4/18* | (2006.01) |
| *C23C 28/00* | (2006.01) |
| *C23C 4/073* | (2016.01) |
| *F04D 29/52* | (2006.01) |
| *B22C 7/02* | (2006.01) |
| *B22C 9/24* | (2006.01) |
| *B22D 29/00* | (2006.01) |
| *F01D 9/02* | (2006.01) |
| *F01D 25/12* | (2006.01) |

(52) U.S. Cl.
CPC .............. *C23C 4/02* (2013.01); *C23C 4/073* (2016.01); *C23C 4/18* (2013.01); *C23C 28/3215* (2013.01); *C23C 28/3455* (2013.01); *F01D 5/18* (2013.01); *F01D 5/186* (2013.01); *F01D 11/08* (2013.01); *F01D 11/122* (2013.01); *F01D 11/127* (2013.01); *F04D 29/526* (2013.01); *F04D 29/685* (2013.01); *F01D 5/187* (2013.01); *F01D 9/023* (2013.01); *F01D 25/12* (2013.01); *F05D 2220/32* (2013.01); *F05D 2230/00* (2013.01); *F05D 2230/211* (2013.01); *F05D 2230/30* (2013.01); *F05D 2230/90* (2013.01); *F05D 2240/11* (2013.01); *F05D 2250/12* (2013.01); *F05D 2250/15* (2013.01); *F05D 2250/182* (2013.01); *F05D 2250/183* (2013.01); *F05D 2250/184* (2013.01); *F05D 2250/185* (2013.01); *F05D 2250/23* (2013.01); *F05D 2250/282* (2013.01); *F05D 2250/292* (2013.01); *F05D 2250/294* (2013.01); *F05D 2250/60* (2013.01); *F05D 2250/75* (2013.01); *F05D 2260/202* (2013.01); *F05D 2260/22141* (2013.01); *F05D 2300/175* (2013.01); *Y02T 50/672* (2013.01); *Y02T 50/673* (2013.01); *Y02T 50/676* (2013.01)

(58) Field of Classification Search
CPC .. F04D 27/0207; F04D 27/02; F05B 2230/90; F05D 2230/90; F05D 2230/10; F05D 2240/11; F05D 2250/28; F05D 2220/32; F05D 2230/211; F05D 2230/00; F05D 2230/30; F05D 2250/60; F05D 2250/282; F05D 2250/75; F05D 2250/294; F05D 2250/292; F05D 2250/23; F05D 2250/185; F05D 2250/184; F05D 2250/183; F05D 2250/182; F05D 2250/15; F05D 2250/12; F05D 2260/22141; F05D 2260/202; F05D 2300/175; F01D 25/145; F01D 25/24; F01D 11/00; F01D 11/001; F01D 11/08; F01D 11/12; F01D 11/122; F01D 11/125; F01D 11/127; F01D 5/288; F01D 5/28; F01D 25/12; F01D 5/087; F01D 5/18; F01D 5/186; F01D 9/023; Y02T 50/67; Y02T 50/672; Y02T 50/673; Y02T 50/676; Y10S 415/914; C23C 4/073; C23C 4/18; C23C 4/02; C23C 28/3215; C23C 28/3455; B22D 29/001; B22D 25/02; B22C 7/02; B22C 9/24
See application file for complete search history.

(56) References Cited

U.S. PATENT DOCUMENTS

| | | | |
|---|---|---|---|
| 3,970,319 A | 7/1976 | Carroll et al. | |
| 4,028,523 A | 6/1977 | Anderl et al. | |
| 4,152,223 A | 5/1979 | Borstein et al. | |
| 4,289,447 A | 9/1981 | Sterman et al. | |
| 4,303,693 A | 12/1981 | Driver | |
| 4,321,310 A | 3/1982 | Ulion et al. | |
| 4,335,190 A | 6/1982 | Bill et al. | |
| 4,405,284 A | 9/1983 | Albrecht et al. | |
| 4,414,249 A | 11/1983 | Ulion et al. | |
| 4,466,772 A * | 8/1984 | Okapuu | F01D 11/08 415/171.1 |
| 4,514,469 A | 4/1985 | Loersch et al. | |
| 4,526,509 A | 7/1985 | Gay et al. | |
| 4,594,053 A | 6/1986 | Soehngen | |
| 4,714,406 A | 12/1987 | Hough | |
| 4,764,089 A | 8/1988 | Strangman | |
| 4,810,334 A | 3/1989 | Honey et al. | |
| 4,885,213 A | 12/1989 | Miyamoto et al. | |
| 5,057,379 A | 10/1991 | Fayeulle et al. | |
| 5,064,727 A | 11/1991 | Naik et al. | |
| 5,124,006 A | 6/1992 | Fayeulle et al. | |
| 5,167,721 A | 12/1992 | Mccomas et al. | |
| 5,169,287 A * | 12/1992 | Proctor | F01D 5/182 415/115 |
| 5,236,745 A | 8/1993 | Gupta et al. | |
| 5,352,540 A | 10/1994 | Schienle et al. | |
| 5,403,669 A | 4/1995 | Gupta et al. | |
| 5,435,889 A | 7/1995 | Dietrich | |
| 5,514,445 A | 5/1996 | Delage et al. | |
| 5,534,308 A | 7/1996 | Bamberg et al. | |
| 5,579,534 A | 11/1996 | Itoh et al. | |
| 5,645,893 A | 7/1997 | Rickerby et al. | |
| 5,681,616 A | 10/1997 | Gupta et al. | |
| 5,716,720 A | 2/1998 | Murphy | |
| 5,721,057 A | 2/1998 | Bamberg et al. | |
| 5,723,078 A | 3/1998 | Nagaraj et al. | |
| 5,817,371 A | 10/1998 | Gupta et al. | |
| 5,817,372 A | 10/1998 | Zheng | |
| 5,866,271 A | 2/1999 | Stueber et al. | |
| 5,894,053 A | 4/1999 | Fried | |
| 5,900,283 A | 5/1999 | Vakil et al. | |
| 5,951,892 A * | 9/1999 | Wolfla | C23C 4/18 219/121.69 |
| 5,952,110 A | 9/1999 | Schell et al. | |
| 6,074,706 A | 6/2000 | Beverley et al. | |
| 6,096,381 A | 8/2000 | Zheng | |
| 6,102,656 A | 8/2000 | Nissley et al. | |
| 6,106,959 A | 8/2000 | Vance et al. | |
| 6,136,453 A | 10/2000 | Ritter et al. | |
| 6,155,778 A * | 12/2000 | Lee | F01D 5/20 415/116 |
| 6,159,553 A | 12/2000 | Li et al. | |
| 6,165,628 A | 12/2000 | Borom et al. | |
| 6,171,351 B1 | 1/2001 | Schroeder et al. | |
| 6,203,021 B1 | 3/2001 | Wolfla et al. | |
| 6,224,963 B1 | 5/2001 | Strangman | |
| 6,231,998 B1 | 5/2001 | Bowker et al. | |
| 6,235,370 B1 | 5/2001 | Merrill et al. | |
| 6,242,050 B1 | 6/2001 | Ritter et al. | |
| 6,251,526 B1 | 6/2001 | Staub | |

(56) References Cited

U.S. PATENT DOCUMENTS

| | | |
|---|---|---|
| 6,264,766 B1 | 7/2001 | Ritter et al. |
| 6,274,201 B1 | 8/2001 | Borom et al. |
| 6,316,078 B1 | 11/2001 | Smialek |
| 6,361,878 B2 | 3/2002 | Ritter et al. |
| 6,368,727 B1 | 4/2002 | Ritter et al. |
| 6,387,527 B1 | 5/2002 | Hasz et al. |
| 6,440,575 B1 | 8/2002 | Heimberg et al. |
| 6,444,331 B2 | 9/2002 | Ritter et al. |
| 6,457,939 B2 * | 10/2002 | Ghasripoor ............ F01D 11/122 29/889.2 |
| 6,471,881 B1 | 10/2002 | Chai et al. |
| 6,482,469 B1 | 11/2002 | Spitsberg et al. |
| 6,485,845 B1 | 11/2002 | Wustman et al. |
| 6,503,574 B1 | 1/2003 | Skelly et al. |
| 6,527,509 B2 | 3/2003 | Kurokawa et al. |
| 6,541,075 B2 | 4/2003 | Hasz et al. |
| 6,582,189 B2 | 6/2003 | Irie et al. |
| 6,607,789 B1 | 8/2003 | Rigney et al. |
| 6,637,643 B2 | 10/2003 | Hasz et al. |
| 6,641,907 B1 | 11/2003 | Merrill et al. |
| 6,644,914 B2 * | 11/2003 | Lawer ...................... B23H 9/10 29/888.3 |
| 6,652,227 B2 | 11/2003 | Fried |
| 6,716,539 B2 | 4/2004 | Subramanian |
| 6,720,087 B2 | 4/2004 | Fried et al. |
| 6,764,771 B1 | 7/2004 | Heimberg et al. |
| 6,812,471 B2 | 11/2004 | Popiolkowski et al. |
| 6,821,578 B2 | 11/2004 | Beele |
| 6,830,428 B2 | 12/2004 | Le et al. |
| 6,846,574 B2 | 1/2005 | Subramanian |
| 6,881,029 B2 | 4/2005 | Le et al. |
| 6,887,528 B2 | 5/2005 | Lau et al. |
| 6,887,595 B1 | 5/2005 | Darolia et al. |
| 6,905,305 B2 | 6/2005 | James |
| 7,029,232 B2 | 4/2006 | Tuffs et al. |
| 7,029,721 B2 | 4/2006 | Hasz et al. |
| 7,150,921 B2 | 12/2006 | Nelson et al. |
| 7,172,820 B2 | 2/2007 | Darolia et al. |
| 7,182,580 B2 | 2/2007 | Bostanjoglo et al. |
| 7,182,581 B2 | 2/2007 | Bostanjoglo et al. |
| 7,210,905 B2 | 5/2007 | Lapworth |
| 7,220,458 B2 | 5/2007 | Hollis et al. |
| 7,250,222 B2 | 7/2007 | Halberstadt et al. |
| 7,338,250 B2 | 3/2008 | Martindale et al. |
| 7,338,719 B2 | 3/2008 | Quadakkers et al. |
| 7,378,132 B2 | 5/2008 | Renteria et al. |
| 7,462,378 B2 | 12/2008 | Nowak et al. |
| 7,479,328 B2 | 1/2009 | Roth-Fagaraseanu et al. |
| 7,507,484 B2 | 3/2009 | Kulkarni et al. |
| 7,509,735 B2 | 3/2009 | Philip et al. |
| 7,510,743 B2 | 3/2009 | Subramanian |
| 7,600,968 B2 | 10/2009 | Nelson et al. |
| 7,614,847 B2 | 11/2009 | Nelson et al. |
| 7,665,960 B2 * | 2/2010 | Shi .......................... F01D 11/24 415/116 |
| 7,686,570 B2 | 3/2010 | Allen |
| 7,723,249 B2 | 5/2010 | Doesburg et al. |
| 7,736,704 B2 | 6/2010 | Chandra et al. |
| 7,819,625 B2 | 10/2010 | Merrill et al. |
| 7,871,244 B2 * | 1/2011 | Marini ................. F01D 11/122 415/173.4 |
| 7,935,413 B2 | 5/2011 | Stamm |
| 7,955,708 B2 | 6/2011 | Doesburg et al. |
| 7,968,144 B2 | 6/2011 | James et al. |
| 8,007,246 B2 | 8/2011 | Rowe et al. |
| 8,021,742 B2 | 9/2011 | Anoshkina et al. |
| 8,061,978 B2 | 11/2011 | Tholen et al. |
| 8,061,979 B1 | 11/2011 | Liang |
| 8,079,806 B2 | 12/2011 | Tholen et al. |
| 8,100,629 B2 | 1/2012 | Lebret |
| 8,123,466 B2 | 2/2012 | Pietraszkiewicz et al. |
| 8,124,252 B2 | 2/2012 | Cybulsky et al. |
| 8,137,820 B2 | 3/2012 | Fairbourn |
| 8,177,494 B2 | 5/2012 | Ward et al. |
| 8,209,831 B2 | 7/2012 | Boehm et al. |
| 8,303,247 B2 | 11/2012 | Schlichting et al. |
| 8,376,697 B2 | 2/2013 | Wiebe et al. |
| 8,388,309 B2 | 3/2013 | Marra et al. |
| 8,453,327 B2 | 6/2013 | Allen |
| 8,506,243 B2 | 8/2013 | Strock et al. |
| 8,511,993 B2 | 8/2013 | Kemppainen et al. |
| 8,535,783 B2 | 9/2013 | Lutjen et al. |
| 8,586,172 B2 | 11/2013 | Rosenzweig et al. |
| 8,770,926 B2 | 7/2014 | Guo et al. |
| 8,777,558 B2 * | 7/2014 | Brunet ................... F04D 29/164 415/173.1 |
| 8,939,707 B1 * | 1/2015 | Lee ........................ F01D 11/122 415/1 |
| 8,939,716 B1 | 1/2015 | Lee et al. |
| 2003/0039764 A1 | 2/2003 | Burns et al. |
| 2003/0054108 A1 | 3/2003 | Beele |
| 2003/0101587 A1 | 6/2003 | Rigney et al. |
| 2003/0175116 A1 | 9/2003 | Le et al. |
| 2004/0256504 A1 | 12/2004 | Segrest et al. |
| 2004/0265120 A1 | 12/2004 | Tuffs et al. |
| 2005/0003172 A1 | 1/2005 | Wheeler et al. |
| 2005/0036892 A1 | 2/2005 | Bajan |
| 2005/0164027 A1 | 7/2005 | Lau et al. |
| 2005/0178126 A1 | 8/2005 | Young et al. |
| 2005/0228098 A1 | 10/2005 | Skoog et al. |
| 2005/0249602 A1 | 11/2005 | Freling et al. |
| 2005/0260434 A1 | 11/2005 | Nelson et al. |
| 2005/0266163 A1 | 12/2005 | Wortman et al. |
| 2006/0105182 A1 | 5/2006 | Brueckner et al. |
| 2006/0110248 A1 | 5/2006 | Nelson et al. |
| 2007/0110900 A1 | 5/2007 | Nowak et al. |
| 2007/0160859 A1 | 7/2007 | Darolia et al. |
| 2007/0178247 A1 | 8/2007 | Bucci et al. |
| 2008/0044273 A1 | 2/2008 | Khalid |
| 2008/0057214 A1 | 3/2008 | Fagoaga et al. |
| 2008/0145643 A1 | 6/2008 | Reynolds et al. |
| 2008/0145694 A1 | 6/2008 | Bucci |
| 2008/0206542 A1 | 8/2008 | Vance et al. |
| 2008/0260523 A1 | 10/2008 | Alvanos et al. |
| 2008/0274336 A1 * | 11/2008 | Merrill ................... C04B 41/009 428/168 |
| 2008/0279678 A1 * | 11/2008 | Merrill ...................... F01D 9/06 415/173.4 |
| 2009/0162670 A1 | 6/2009 | Lau et al. |
| 2009/0311416 A1 | 12/2009 | Nelson et al. |
| 2009/0324401 A1 | 12/2009 | Calla |
| 2010/0003894 A1 | 1/2010 | Miller et al. |
| 2010/0104773 A1 | 4/2010 | Neal et al. |
| 2010/0136254 A1 | 6/2010 | Darolia et al. |
| 2011/0003119 A1 | 1/2011 | Doesburg et al. |
| 2011/0014060 A1 | 1/2011 | Bolcavage et al. |
| 2011/0044821 A1 | 2/2011 | Rowe et al. |
| 2011/0048017 A1 | 3/2011 | Margolies et al. |
| 2011/0076413 A1 | 3/2011 | Margolies et al. |
| 2011/0097538 A1 | 4/2011 | Bolcavage et al. |
| 2011/0116920 A1 | 5/2011 | Strock et al. |
| 2011/0143163 A1 | 6/2011 | Halberstadt et al. |
| 2011/0151219 A1 | 6/2011 | Nagaraj et al. |
| 2011/0182720 A1 | 7/2011 | Kojima et al. |
| 2012/0063881 A1 | 3/2012 | Tallman |
| 2012/0107103 A1 | 5/2012 | Kojima et al. |
| 2012/0272653 A1 | 11/2012 | Merrill et al. |
| 2012/0275908 A1 | 11/2012 | Guo et al. |
| 2012/0295061 A1 | 11/2012 | Bunker et al. |
| 2013/0004305 A1 | 1/2013 | Giovannetti et al. |
| 2013/0017072 A1 | 1/2013 | Ali et al. |
| 2013/0034661 A1 | 2/2013 | Schneiderbanger et al. |
| 2013/0052415 A1 | 2/2013 | Burns et al. |
| 2013/0122259 A1 | 5/2013 | Lee |
| 2013/0186304 A1 | 7/2013 | Pabla et al. |
| 2013/0189085 A1 | 7/2013 | Werner et al. |
| 2013/0189441 A1 | 7/2013 | Pabla et al. |
| 2014/0127005 A1 | 5/2014 | Schreiber |

FOREIGN PATENT DOCUMENTS

| | | |
|---|---|---|
| DE | 10057187 A1 | 5/2002 |
| DE | 10117127 A1 | 10/2002 |

(56) References Cited

FOREIGN PATENT DOCUMENTS

| | | | |
|---|---:|---|---|
| DE | 10124398 | A1 | 11/2002 |
| DE | 10241741 | A1 | 3/2004 |
| DE | 10357180 | A1 | 6/2005 |
| DE | 102009011913 | A1 | 9/2010 |
| DE | 102011004503 | A1 | 8/2012 |
| DE | 102011077620 | A1 | 12/2012 |
| EP | 0816526 | A2 | 1/1998 |
| EP | 0944797 | A1 | 9/1999 |
| EP | 1217089 | A2 | 6/2002 |
| EP | 1260608 | A1 | 11/2002 |
| EP | 1304395 | A1 | 4/2003 |
| EP | 1491657 | A1 | 12/2004 |
| EP | 1491658 | A1 | 12/2004 |
| EP | 1522604 | A1 | 4/2005 |
| EP | 2140973 | A1 | 1/2010 |
| EP | 2202328 | A1 | 6/2010 |
| EP | 2434102 | A2 | 3/2012 |
| EP | 2589872 | A2 | 5/2013 |
| EP | 2644836 | A2 | 10/2013 |
| GB | 2146707 | A | 4/1985 |
| GB | 2222179 | A | 2/1990 |
| WO | 9943861 | A1 | 9/1999 |
| WO | 2005038074 | A1 | 4/2005 |
| WO | 2008103163 | A2 | 8/2008 |
| WO | 2012160586 | A1 | 11/2012 |

\* cited by examiner

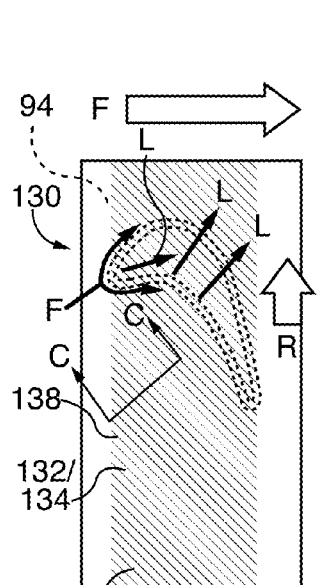
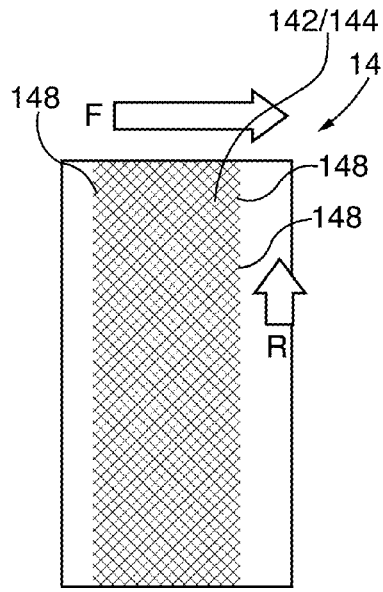
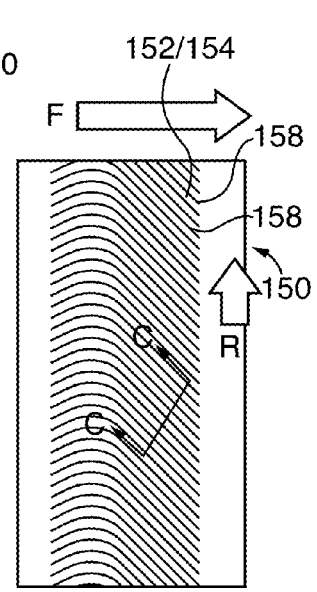
FIG. 7
PRIOR ART
FIG. 8
PRIOR ART
FIG. 9
PRIOR ART
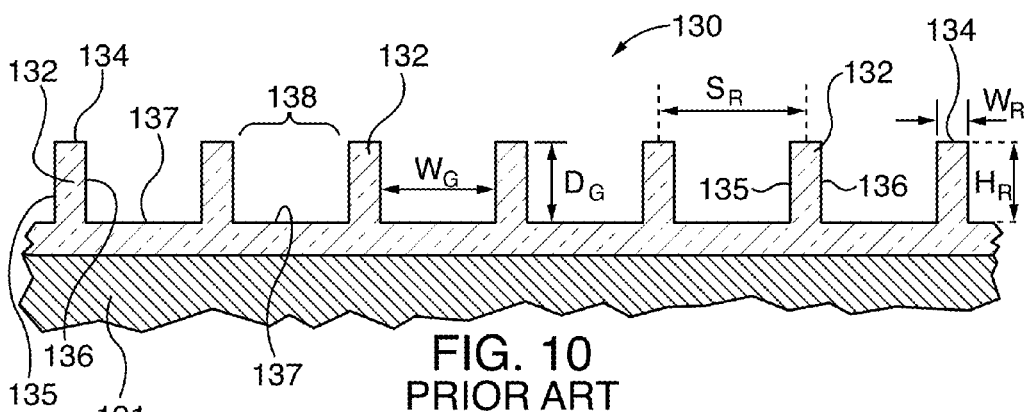
FIG. 10
PRIOR ART
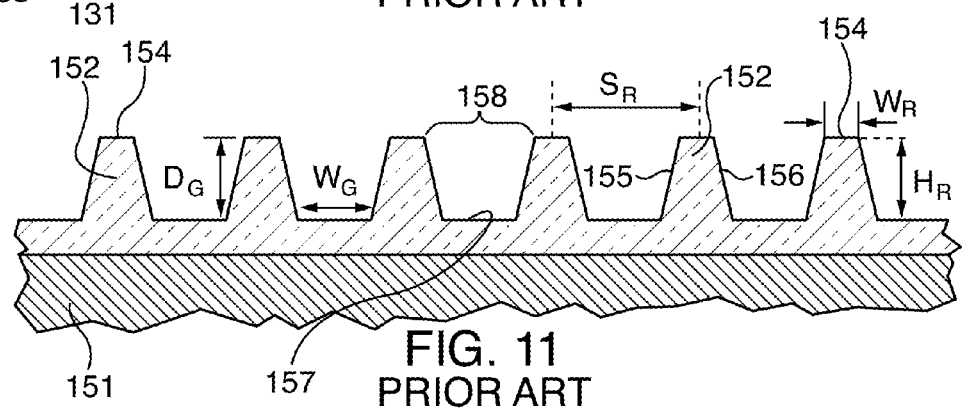
FIG. 11
PRIOR ART

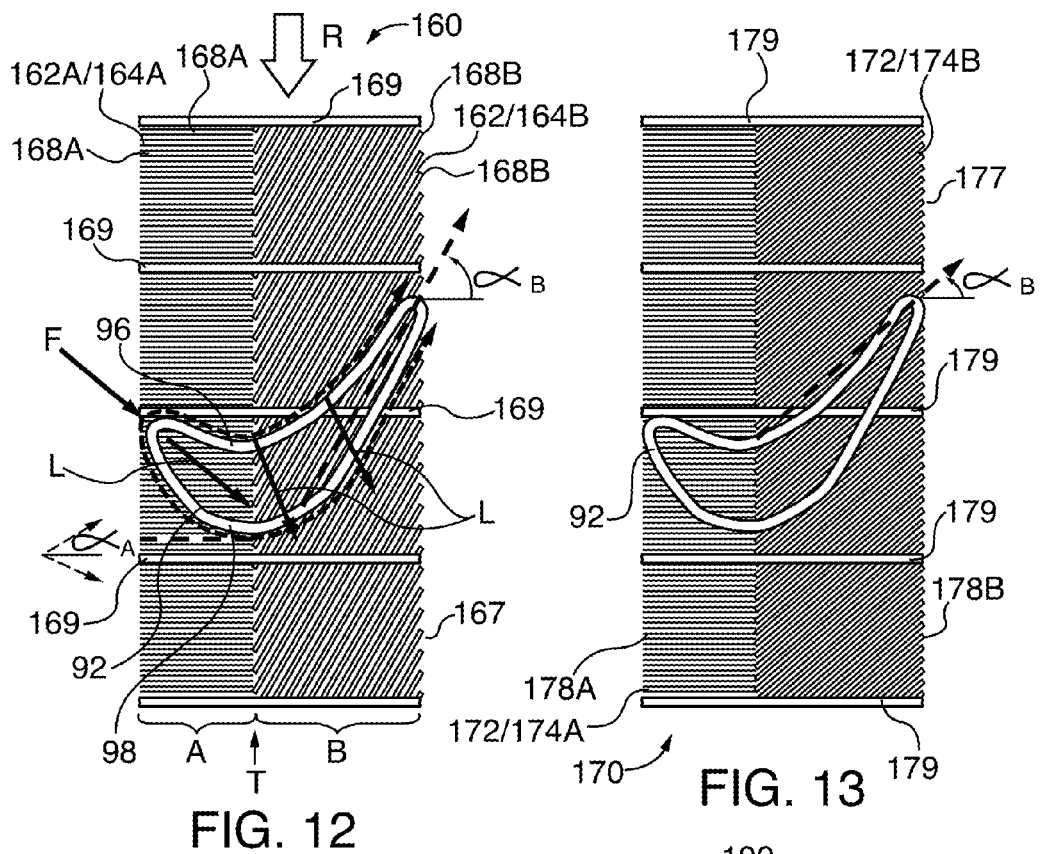
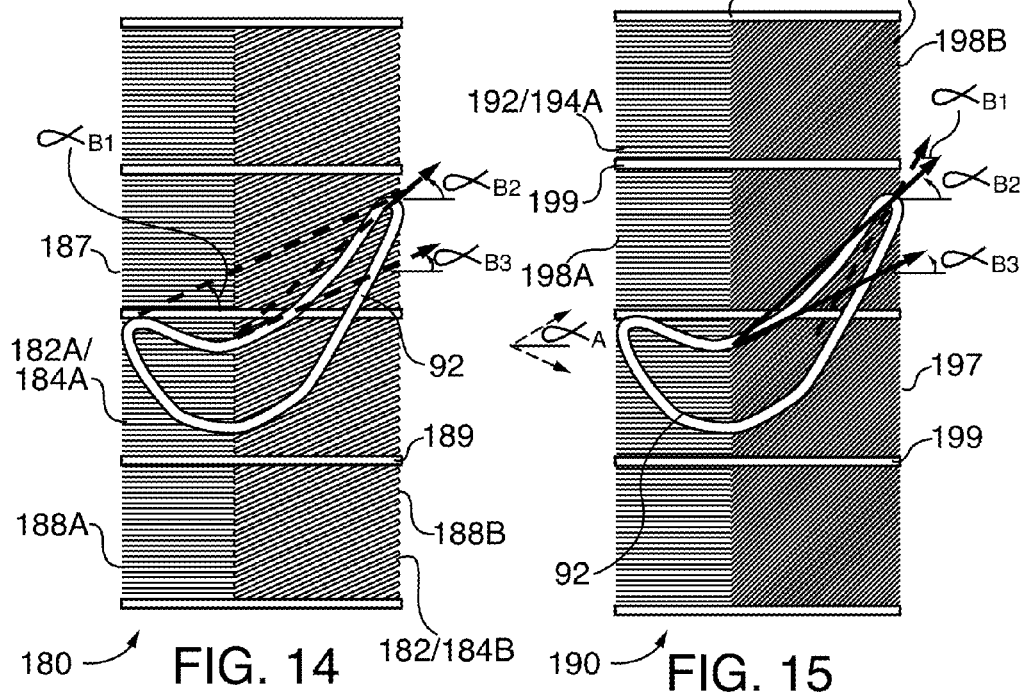

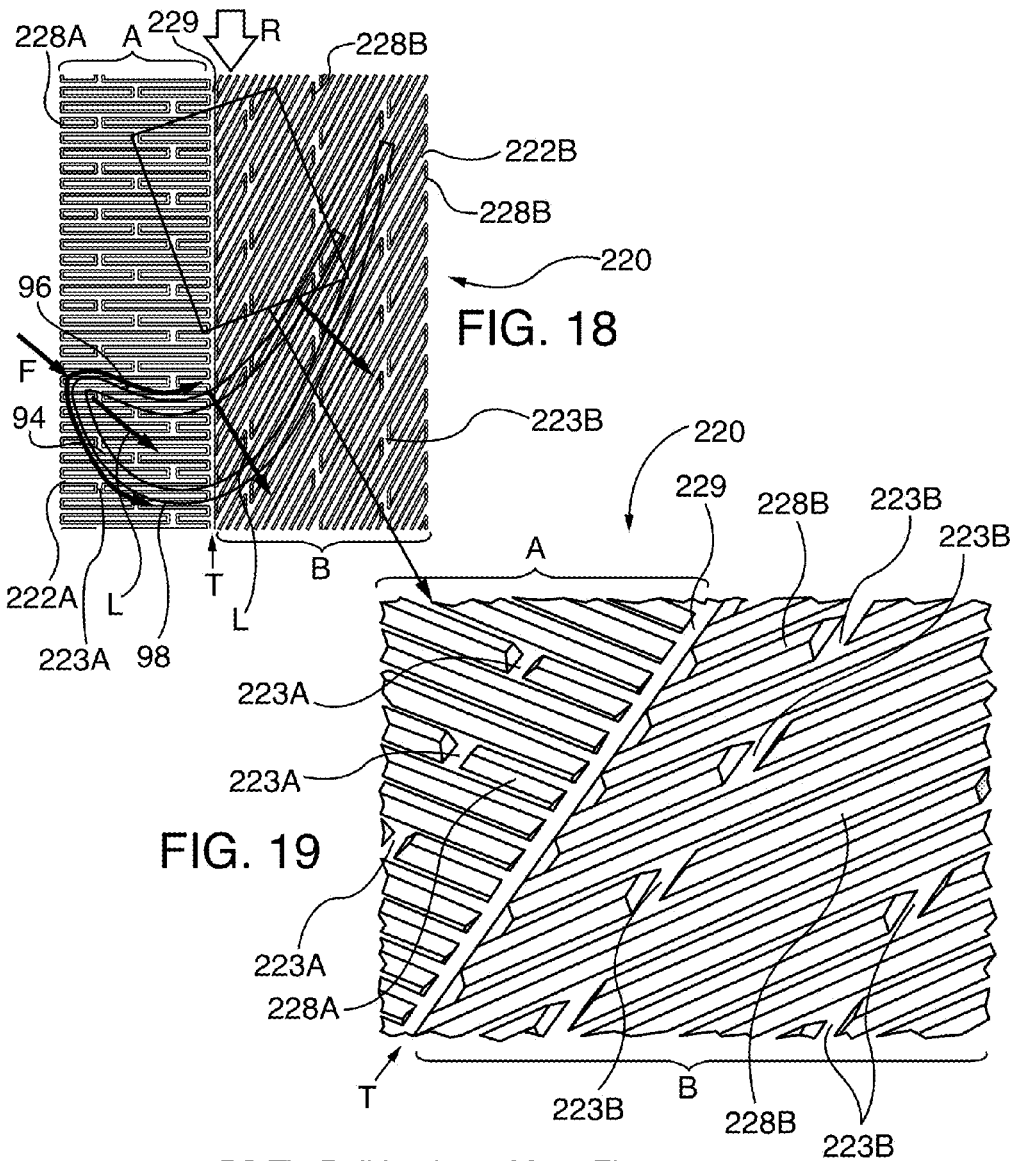
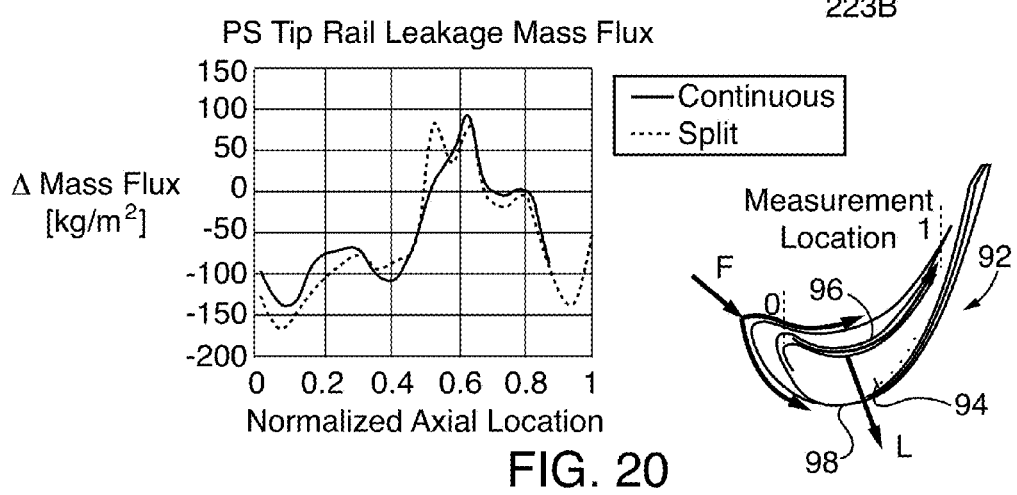
FIG. 20

TURBINE SHROUD WITH ABRADABLE LAYER HAVING DIMPLED FORWARD ZONE

PRIORITY CLAIM AND CROSS-REFERENCE TO RELATED APPLICATIONS

This application claims priority to the International Patent Application entitled "TURBINE ABRADABLE LAYER WITH OMNI-DIRECTIONAL FORWARD ZONE SURFACE FEATURES", assigned Application No. PCT/US2015/064615, filed Dec. 9, 2015, which in turn claims priority under International Patent Application "TURBINE ABRADABLE LAYER WITH COMPOSITE NON INFLECTED BI ANGLE RIDGES AND GROOVES", assigned Application No. PCT/US2015/016315, filed Feb. 18, 2015, which in turn claims priority under International Patent Application "COMPOSITE "HOCKEY STICK"-LIKE GROOVES ON TURBINE RING SEGMENT SURFACE", assigned Application No. PCT/US2014/033785, filed Apr. 11, 2014, which in turn claims priority under U.S. patent application Ser. No. 14/188,992, filed Feb. 25, 2014, "TURBINE ABRADABLE LAYER WITH PROGRESSIVE WEAR ZONE TERRACED RIDGES", now U.S. Pat. No. 8,939,707, issued Jan. 27, 2015, the entire contents of all of which are incorporated by reference herein. This application will be a continuation-in-part of the aforementioned U.S. patent application Ser. No. 14/188,992 in National Phase prosecution before the United States Patent and Trademark Office.

This application also claims priority under International Patent Application "TURBINE ABRADABLE LAYER WITH AIRFLOW DIRECTING PIXELATED SURFACE FEATURE PATTERNS", assigned Application No. PCT/US2015/016271, filed Feb. 18, 2015, which in turn claims priority under U.S. patent application Ser. No. 14/188,941, filed Feb. 25, 2014, "TURBINE ABRADABLE LAYER WITH PROGRESSIVE WEAR ZONE HAVING A FRANGIBLE OR PIXELATED NIB SURFACE", and U.S. patent application Ser. No. 14/188,958, filed Feb. 25, 2014, "TURBINE ABRADABLE LAYER WITH PROGRESSIVE WEAR ZONE MULTI LEVEL RIDGE ARRAYS", the entire contents of all of which are incorporated by reference herein. This application will be a continuation-in-part of the aforementioned U.S. patent application Ser. Nos. 14/188,941 and 14/188,958 in National Phase prosecution before the United States Patent and Trademark Office.

BACKGROUND OF THE INVENTION

1. Field of the Invention

The invention relates to abradable surfaces for turbine engines, including gas or steam turbine engines, the engines incorporating such abradable surfaces, and methods for reducing engine blade tip wear and blade tip leakage. More particularly various embodiments of the invention relate to abradable surfaces with a zonal system of forward (zone A) and rear or aft sections (zone B). The zone A profile comprises an array pattern of depression dimples, or upwardly projecting dimples, or both in the abradable surface. The aft zone B surface features comprise an array pattern of ridges and grooves. The forward zone A dimples are aerodynamically compatible with different blade camber profiles and resist hot working gas erosion of the forward zone.

2. Description of the Prior Art

As described in the aforementioned U.S. Pat. No. 8,939,707, known turbine engines, including gas turbine engines and steam turbine engines, incorporate shaft-mounted turbine blades circumferentially circumscribed by a turbine casing or housing. Hot gasses flowing past the turbine blades cause blade rotation that converts thermal energy within the hot gasses to mechanical work, which is available for powering rotating machinery, such as an electrical generator. Referring to FIGS. 1-6, known turbine engines, such as the gas turbine engine 80 include a multi-stage compressor section 82, a combustor section 84, a multi-stage turbine section 86 and an exhaust system 88. Atmospheric pressure intake air is drawn into the compressor section 82 generally in the direction of the flow arrows F along the axial length of the turbine engine 80. The intake air is progressively pressurized in the compressor section 82 by rows rotating compressor blades and directed by mating compressor vanes to the combustor section 84, where it is mixed with fuel and ignited. The ignited fuel/air mixture, now under greater pressure and velocity than the original intake air, is directed to the sequential rows $R_1$, $R_2$, etc., in the turbine section 86. The engine's rotor and shaft 90 has a plurality of rows of airfoil cross sectional shaped turbine blades 92 terminating in distal blade tips 94 in the compressor 82 and turbine 86 sections. For convenience and brevity further discussion of turbine blades and abradable layers in the engine will focus on the turbine section 86 embodiments and applications, though similar constructions are applicable for the compressor section 82. Each blade 92 has a concave profile high-pressure side 96 and a convex low-pressure side 98. The high temperature and pressure combustion gas, flowing in the combustion flow direction F imparts rotational motion on the blades 92, spinning the rotor. As is well known, some of the mechanical power imparted on the rotor shaft is available for performing useful work. The combustion gasses are constrained radially distal the rotor by turbine casing 100 and proximal the rotor by air seals 102. Referring to the Row 1 section shown in FIG. 2, respective upstream vanes 104 and downstream vanes 106 direct upstream combustion gas generally parallel to the incident angle of the leading edge of turbine blade 92 and redirect downstream combustion gas exiting the trailing edge of the blade.

The turbine engine 80 turbine casing 100 proximate the blade tips 94 is lined with a ring segment that comprises a plurality of sector shaped abradable components 110, each having a support surface 112 retained within and coupled to the casing and an abradable substrate 120 that is in opposed, spaced relationship with the blade tip by a blade tip gap G. The support surface 112 has upstream and downstream ends relative to the turbine generalized flow direction F and a support surface axis that is parallel to the corresponding turbine blade rotational axis, which defines the curvature radius of the curved inwardly facing abradable substrate 120. Forward (upstream of the combustion hot working gas flow direction, F) and aft (downstream in the direction F) axial faces of the support surface 112 and the abradable substrate 120 are generally perpendicular to the support surface axis and the turbine blade rotational axis. The abradable substrate is often constructed of a metallic/ceramic material that has high thermal and thermal erosion resistance and that maintains structural integrity at high combustion temperatures. As the abradable surface 120 metallic ceramic materials is often more abrasive than the turbine blade tip 94 material a blade tip gap G is maintained to avoid contact between the two opposed components that might at best cause premature blade tip wear and in worse case circumstances might cause engine damage. Some known abradable components 110 are constructed with a monolithic metallic/ceramic abradable substrate 120. Other known abradable components 110 are constructed with a composite matrix composite (CMC) structure, comprising a ceramic support surface 112 to which is bonded a friable graded insulation (FGI) ceramic strata of multiple layers of closely-packed hollow ceramic spherical particles, surrounded by smaller particle ceramic filler, as described in U.S. Pat. No. 6,641,907. Spherical particles having different properties are layered in the substrate 120, with generally more easily abradable spheres forming the upper layer to reduce blade tip 94 wear. Another CMC structure is described in U.S. Patent Publication No. 2008/0274336, wherein the surface includes a cut-grooved pattern between the hollow ceramic spheres. The grooves are intended to reduce the abradable surface material cross sectional area to reduce potential blade tip 94 wear, if they contact the abradable surface. Other commonly known abradable components 110 are constructed with a metallic base layer support surface 112 to which is applied a thermally sprayed ceramic/metallic layer that forms the abradable substrate layer 120. As will be described in greater detail the thermally sprayed metallic layer may include grooves, depressions or ridges to reduce abradable surface material cross section for potential blade tip 94 wear reduction.

In addition to the desire to prevent blade tip 94 premature wear or contact with the abradable substrate 120, as shown in FIG. 3, for ideal airflow and power efficiency each respective blade tip 94 desirably has a uniform blade tip gap G relative to the abradable component 110 that is as small as possible (ideally zero clearance) to minimize blade tip airflow leakage L between the high pressure blade side 96 and the low pressure blade side 98 as well as axially in the combustion flow direction F. However, manufacturing and operational tradeoffs require blade tip gaps G greater than zero. Such tradeoffs include tolerance stacking of interacting components, so that a blade constructed on the higher end of acceptable radial length tolerance and an abradable component abradable substrate 120 constructed on the lower end of acceptable radial tolerance do not impact each other excessively during operation. Similarly, small mechanical alignment variances during engine assembly can cause local variations in the blade tip gap. For example in a turbine engine of many meters axial length, having a turbine casing abradable substrate 120 inner diameter of multiple meters, very small mechanical alignment variances can impart local blade tip gap G variances of a few millimeters.

During turbine engine 80 operation the turbine engine casing 100 may experience out of round (e.g., egg shaped) thermal distortion as shown in FIGS. 4 and 6. Casing 100 thermal distortion potential increases between operational cycles of the turbine engine 80 as the engine is fired up to generate power and subsequently cooled for servicing after thousands of hours of power generation. Commonly, as shown in FIG. 6, greater casing 100 and abradable component 110 distortion tends to occur at the uppermost 122 and lowermost 126 casing circumferential positions (i.e., 6:00 and 12:00 positions) compared to the lateral right 124 and left 128 circumferential positions (i.e., 3:00 and 9:00). If, for example as shown in FIG. 4 casing distortion at the 6:00 position causes blade tip contact with the abradable substrate 120 one or more of the blade tips may be worn during operation, increasing the blade tip gap locally in various other less deformed circumferential portions of the turbine casing 100 from the ideal gap G to a larger gap $G_W$ as shown in FIG. 5. The excessive blade gap $G_W$ distortion increases blade tip leakage L, diverting hot combustion gas away from the turbine blade 92 airfoil, reducing the turbine engine's efficiency.

In the past flat abradable surface substrates 120 were utilized and the blade tip gap G specification conservatively chosen to provide at least a minimal overall clearance to prevent blade tip 94 and abradable surface substrate contact within a wide range of turbine component manufacturing tolerance stacking, assembly alignment variances, and thermal distortion. Thus, a relatively wide conservative gap G specification chosen to avoid tip/substrate contact sacrificed engine efficiency. Commercial desire to enhance engine efficiency for fuel conservation has driven smaller blade tip gap G specifications: preferably no more than 2 millimeters and desirably approaching 1 millimeter.

In order to reduce likelihood of blade tip/substrate contact, abradable components comprising metallic base layer supports with thermally sprayed metallic/ceramic abradable surfaces have been constructed with three dimensional plan form profiles, such as shown in FIGS. 7-11. The exemplary known abradable surface component 130 of FIGS. 7 and 10 has a metallic base layer support 131 for coupling to a turbine casing 100, upon which a thermally sprayed metallic/ceramic layer has been deposited and formed into three-dimensional ridge and groove profiles by known deposition or ablative material working methods. Specifically in these cited figures a plurality of ridges 132 respectively have a common height $H_R$ distal ridge tip surface 134 that defines the blade tip gap G between the blade tip 94 and it. Each ridge also has sidewalls 135 and 136 that extend from the substrate surface 137 and define grooves 138 between successive ridge opposed sidewalls. The ridges 132 are arrayed with parallel spacing $S_R$ between successive ridge centerlines and defined groove widths $W_G$. Due to the abradable component surface symmetry, groove depths $D_G$ correspond to the ridge heights $H_R$. Compared to a solid smooth surface abradable, the ridges 132 have smaller cross section and more limited abrasion contact in the event that the blade tip gap G becomes so small as to allow blade tip 94 to contact one or more tips 134. However, the relatively tall and widely spaced ridges 132 allow blade leakage L into the grooves 138 between ridges, as compared to the prior continuous flat abradable surfaces. In an effort to reduce blade tip leakage L, the ridges 132 and grooves 138 were oriented horizontally in the direction of combustion flow F (not shown) or diagonally across the width of the abradable surface 137, as shown in FIG. 7, so that they would tend to inhibit the leakage. Other known abradable components 140, shown in FIG. 8, have arrayed grooves 148 in crisscross patterns, forming diamond shaped ridge plan forms 142 with flat, equal height ridge tips 144. Additional known abradable components have employed triangular rounded or flat tipped triangular ridges 152 shown in FIGS. 9 and 11. In the abradable component 150 of FIGS. 9 and 11, each ridge 152 has symmetrical sidewalls 155, 156 that terminate in a flat ridge tip 154. All ridge tips 154 have a common height $H_R$ and project from the substrate surface 157. Grooves 158 are curved and have a similar plan form profile as the blade tip 94 camber line. Curved grooves 158 generally are more difficult to form than linear grooves 138 or 148 of the abradable components shown in FIGS. 7 and 8.

Past abradable component, designs have required stark compromises between blade tips wear resulting from contact between the blade tip and the abradable surface and blade tip leakage that reduces turbine engine operational efficiency. Optimizing engine operational efficiency required reduced blade tip gaps and smooth, consistently flat abradable surface topology to hinder air leakage through the blade tip gap, improving initial engine performance and energy conservation. In another drive for increased gas turbine operational efficiency and flexibility so-called "fast start" mode engines were being constructed that required faster full power ramp up (order of 40-50 MW/minute). Aggressive ramp-up rates exacerbated potential higher incursion of blade tips into ring segment abradable coating, resulting from quicker thermal and mechanical growth and higher distortion and greater mismatch in growth rates between rotating and stationary components. This in turn required greater turbine tip clearance in the "fast start" mode engines, to avoid premature blade tip wear, than the blade tip clearance required for engines that are configured only for "standard" starting cycles. Thus as a design choice one needed to balance the benefits of quicker startup/lower operational efficiency larger blade tip gaps or standard startup/higher operational efficiency smaller blade tip gaps.

Traditionally, standard or fast start engines required different construction to accommodate the different needed blade-tip gap parameters of both designs. Whether in standard or fast start configuration, decreasing blade tip gap for engine efficiency optimization ultimately risked premature blade tip wear, opening the blade tip gap and ultimately decreasing longer-term engine performance efficiency during the engine operational cycle. The aforementioned ceramic matrix composite (CMC) abradable component designs sought to maintain airflow control benefits and small blade tip gaps of flat surface profile abradable surfaces by using a softer top abradable layer to mitigate blade tip wear. The abradable components of the U.S. Patent Publication No. 2008/0274336 also sought to reduce blade tip wear by incorporating grooves between the upper layer hollow ceramic spheres. However, groove dimensions were inherently limited by the packing spacing and diameter of the spheres in order to prevent sphere breakage. Adding uniform height abradable surface ridges to thermally sprayed substrate profiles as a compromise solution to reduce blade tip gap while reducing potential rubbing contact surface area between the ridge tips and blade tips reduced likelihood of premature blade tip wear/increasing blade tip gap but at the cost of increased blade tip leakage into grooves between ridges. As noted above, attempts have been made to reduce blade-tip leakage flow by changing plan form orientation of the ridge arrays to attempt to block or otherwise control leakage airflow into the grooves.

SUMMARY

In various embodiments, turbine casing abradable components have distinct axially varying zones of: (i) composite multi orientation groove and vertically projecting ridges, or (ii) non-directional projecting dimple, or (iii) non-directional, varying-porosity formed depression/hole plan form patterns, or combinations of (i)-(iii), to reduce, redirect and/or block blade tip airflow leakage from the turbine blade airfoil high to low pressure sides. Plan form pattern embodiments that include composite multi groove/ridge patterns have distinct forward upstream (zone A) and aft downstream patterns (zone B). Some plan form pattern embodiments have an intermediate or mid pattern (zone I), between the A and B zones. Those combined zone AB or A/I/B ridge/groove array plan forms direct gas flow trapped inside the grooves toward the downstream combustion flow F direction to discourage gas flow leakage directly from the pressure side of the turbine blade airfoil toward the suction side of the airfoil in the localized blade leakage direction L. The forward zone is generally defined between the leading edge and the mid-chord of the blade airfoil: roughly one-third to one-half of the total axial length of the airfoil. In some embodiments a mid or intermediate array pattern zone I is oriented axially downstream of the forward zone. The remainder of the array pattern comprises the aft zone B. The mid (I) and aft downstream (B) zone grooves and ridges are angularly oriented opposite the blade rotational direction R. The range of angles is approximately 30% to 120% of the associated turbine blade 92 camber or trailing edge angle. Plan form pattern zones that incorporate projecting dimple, or varying-porosity formed depression/hole profiles are generally in the fore or forward zone A, while ridge/groove patterns are provided in the intermediate or mid (zone I) and aft or downstream (zone B) axial regions.

In other various embodiments, the abradable components are constructed with vertically projecting ridges or ribs or other types of varying cross sectional area structure having first lower and second upper wear zones. The ridge or other structural shape first lower zone, proximal the abradable surface, is constructed to optimize engine airflow characteristics with plan form arrays and projections tailored to reduce, redirect and/or block blade tip airflow leakage from the turbine airfoil higher pressure, concave side to its lower pressure, convex side. The lower zone of the ridges are also optimized to enhance the abradable component and surface mechanical and thermal structural integrity, thermal resistance, thermal erosion resistance and wear longevity. The ridge or other structure upper zone is formed above the lower zone and is optimized to minimize blade tip gap and wear by being more easily abradable than the lower zone—generally by having less cross-sectional surface area than the lower zone. Various embodiments of the abradable component afford easier abradability of the upper zone with upper sub ridges or nibs or protrusions having smaller cross sectional area than the lower zone rib structure, or higher porosity by removing material from the surface cross section (e.g., by forming indentations, grooves, hole patterns or the like). In some embodiments, the upper sub ridges or nibs are formed to bend or otherwise flex in the event of minor blade tip contact and wear down and/or shear off in the event of greater blade tip contact. In other embodiments, the upper zone sub ridges or nibs are pixelated into arrays of upper wear zones so that only those nibs in localized contact with one or more blade tips are worn while others outside the localized wear zone remain intact. While upper zone portions of the ridges are worn away, they cause less blade tip wear than prior known monolithic ridges. In embodiments of the invention as the upper zone ridge portions are worn away, the remaining lower ridge portion preserves engine efficiency by controlling blade tip leakage. In the event that the localized blade tip gap is further reduced, the blade tips wear away the lower ridge portion at that location. However, the relatively higher ridges outside that lower ridge portion localized wear area maintain smaller blade tip gaps to preserve engine performance efficiency. Additionally the multi-level wear-zone profiles allow a single turbine engine design to be operated in standard or "fast start" modes. When operated in fast start mode the engine will have a propensity to wear the upper wear zone layer with less likelihood of excessive blade tip wear, while preserving the lower wear zone aerodynamic functionality. When the same engine is operated in standard start mode, there is more likelihood that both abradable upper and lower wear zones will be preserved for efficient engine operation. More than two layered wear zones (e.g., upper, middle, and lower wear zones) can be employed in an abradable component constructed in accordance with embodiments of the invention.

In some embodiments, ridge and groove, vertically formed protrusion, hole pattern profiles and plan form arrays that vary cross sectional surface area of the abradable surface are tailored locally or universally throughout the abradable component by forming multi-layer grooves with selected orientation angles and/or cross sectional profiles chosen to reduce blade tip leakage. In some embodiments the abradable component surface plan form arrays and profiles of ridges and grooves or other surface cross-sectional area structures provide enhanced blade tip leakage airflow control yet also facilitate simpler manufacturing techniques than known abradable components.

Embodiments described herein include ring segments for turbine engines, turbine engines incorporating such ring segments and methods for inhibiting turbine blade tip leakage in a turbine engine. The ring segment comprises segments, respectively, which have curved support surface, as well as upstream and downstream axial ends, which is adapted for coupling to a turbine casing inner circumference. The support surface curvature radius is defined by a support surface central axis, which generally is in parallel alignment with the turbine engine rotor rotational axis. The ring segment includes an abradable surface with a zonal system of forward (zone A) and rear or aft sections (zone B) surface features. The zone A surface profile comprises an array pattern of non-directional depression dimples, or upwardly projecting dimples, or both, in the abradable surface, which are aerodynamically insensitive to flow conditions entering the gap between the ring segment and the blade. The dimpled forward zone A surface features reduce surface solidity in a controlled manner, to help increase abradability during blade tip rubbing incidents, yet they provide sufficient material to resist incoming hot working fluid erosion of the abradable surface. In addition, the dimples provide generic forward section aerodynamic profiling to the abradable surface, compatible with airfoil camber profiles of different blades. The aft zone B surface features comprise an array pattern of ridges and grooves.

More particularly, exemplary embodiments of the invention feature a turbine engine ring segment component, adapted for coupling to an interior circumference of a turbine casing in opposed orientation with a rotating turbine blade tip circumferential swept path. The blade tip has a rotational direction, a leading edge, a mid-chord cutoff point on its pressure side concave surface and a trailing edge. The component comprises a curved support surface adapted for coupling to a turbine casing inner circumference, with the support surface having upstream and downstream axial ends and a support surface curvature radius defined by a support surface central axis. An abradable substrate is coupled to the support surface, having a substrate surface facing the support surface central axis. The substrate surface defines a forward zone originating nearer the support surface upstream end and terminating axially between the support surface ends. The substrate also defines an aft zone originating at the adjoining forward zone termination and terminating axially nearer the support surface downstream end. The forward zone defines a plan form pattern of projection or indentation dimples facing the support surface central axis, with the dimples respectively having cross sectional profiles, for selectively varying the forward zone's hot working gas erosion resistance, porosity, and/or abradability. The aft zone defines a plan form pattern of grooves and vertically projecting ridges facing the support surface central axis, angularly oriented at a first forward angle transverse to the support surface central axis. The respective forward zone dimple pattern enhances higher hot working gas erosion resistance than in the aft zone; and the respective aft zone ridge and groove pattern enhances greater porosity and abradability than in the forward zone.

Other exemplary embodiments of the invention feature a turbine engine, comprising a turbine housing including a turbine casing interior circumference, and a rotor having blades rotatively mounted in the turbine housing along a turbine blade rotational axis. The blade distal tips sweep a blade tip circumferential swept path in the blade rotation direction, which swept path extends axially with respect to the turbine casing interior circumference. Each turbine blade has a leading edge, a mid-chord cutoff point on its pressure side concave surface and a trailing edge, oriented at a trailing edge angle relative to turbine blade rotational axis. The engine also includes a ring segment component having a curved support surface adapted for coupling to a turbine casing inner circumference. The support surface has upstream and downstream axial ends and a support surface curvature radius defined by a support surface central axis. An abradable substrate is coupled to the support surface, having a substrate surface facing the support surface central axis. The substrate surface defines a forward zone originating nearer the support surface upstream end and terminating axially between the support surface ends. The substrate surface defines an aft zone originating at the adjoining forward zone termination and terminating axially nearer the support surface downstream end. The forward zone defines a plan form pattern of projection or indentation dimples facing the support surface central axis, with the dimples respectively having cross sectional profiles, for selectively varying hot working gas erosion resistance, porosity, and/or abradability of the forward zone. The aft zone defines a plan form pattern of grooves and vertically projecting ridges facing the support surface central axis, angularly oriented at a first forward angle transverse to the support surface central axis and opposite corresponding turbine blade rotational direction. The forward zone dimple pattern enhances higher hot working gas erosion resistance than in the aft zone; and the aft zone ridge and groove pattern enhances greater porosity and abradability than in the forward zone.

Additional exemplary embodiments of the invention feature a method for enhancing operational service life of a turbine engine. The method is practiced by providing a turbine engine, having a turbine housing, including a turbine casing interior circumference, and a rotor having blades rotatively mounted in the turbine housing along a turbine blade rotational axis. Distal tips of the blades form a blade tip circumferential swept path in the blade rotation direction, the swept path extending axially with respect to the turbine casing interior circumference. Each turbine blade has a leading edge, a mid-chord cutoff point on its pressure side concave surface and a trailing edge, oriented at a trailing edge angle relative to turbine blade rotational axis. The provided turbine engine also has a ring segment component having a curved support surface, which is adapted for coupling to a turbine casing inner circumference. The support surface has upstream and downstream axial ends and a support surface curvature radius defined by a support surface central axis. An abradable substrate is coupled to the support surface, having a substrate surface facing the support surface central axis. The substrate surface defines a forward zone, originating nearer the support surface upstream end and terminating axially between the support surface ends. The substrate surface also defines an aft zone, originating at the adjoining forward zone termination and terminating axially nearer the support surface downstream end. A plan form pattern of projection or indentation dimples facing the support surface central axis is formed in the forward zone, with the dimples respectively having cross sectional profiles. In the aft zone, a plan form pattern of grooves and vertically projecting ridges is formed. The rooves and ridges face the support surface central axis, and are angularly oriented at a first forward angle transverse to the support surface central axis and opposite corresponding turbine blade rotational direction, for selectively varying hot working gas erosion resistance, porosity, and/or abradability in the aft zone. The respective forward zone dimple pattern enhances higher hot working gas erosion resistance than in the aft zone; and the respective aft zone ridge and groove pattern enhances greater porosity and abradability than in the forward zone.

The respective features of the embodiments described herein may be applied jointly or severally in any combination or sub-combination.

BRIEF DESCRIPTION OF THE DRAWINGS

The embodiments are described the following detailed description in conjunction with the accompanying drawings, in which:

FIGS. 7-9 are plan or plan form views of known ridge and groove patterns for turbine engine abradable surfaces;

FIGS. 10 and 11 are cross sectional elevational views of known ridge and groove patterns for turbine engine abradable surfaces taken along sections C-C of FIGS. 7 and 9, respectively;

FIGS. 12-17 are plan or plan form views of "hockey stick" configuration ridge and groove patterns of turbine engine abradable surfaces, with schematic overlays of turbine blades;

FIGS. 18 and 19 are plan or plan form views of another "hockey stick" configuration ridge and groove pattern for a turbine engine abradable surface that includes vertically oriented ridge or rib arrays aligned with a turbine blade rotational direction, and a schematic overlay of a turbine blade;

FIG. 20 is a comparison graph of simulated blade tip leakage mass flux from leading to trailing edge for a respective exemplary continuous groove hockey stick abradable surface profile of the type shown in FIGS. 12-17 and a split groove with interrupting vertical ridges hockey stick abradable surface profile of the type shown in FIGS. 18 and 19;

Figure 1:
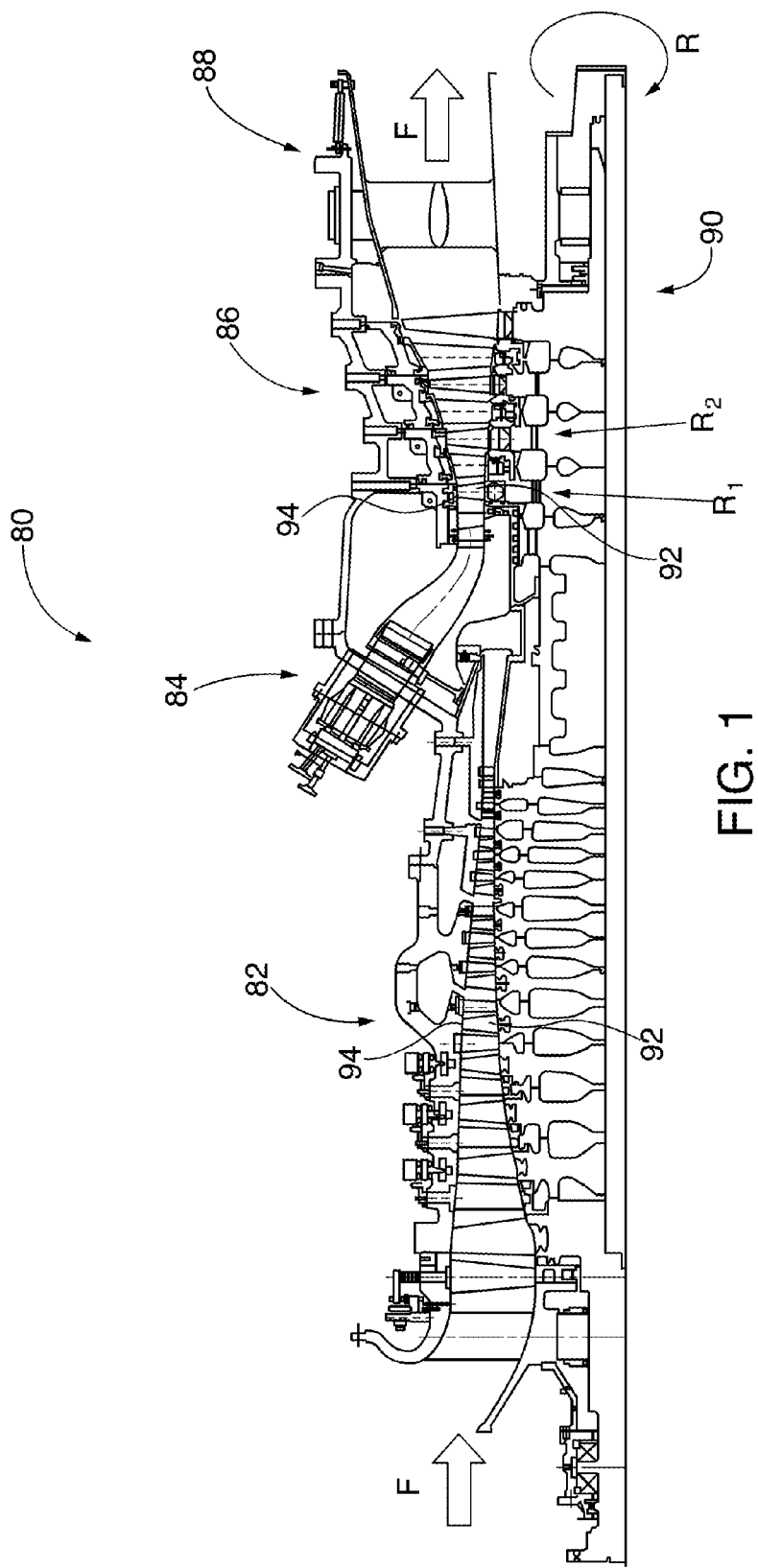
FIG. 1 is a partial axial cross sectional view of an exemplary known gas turbine engine.

To facilitate understanding, identical reference numerals have been used, where possible, to designate identical elements that are common to the figures. The figures are not drawn to scale. The following common designators for dimensions, cross sections, fluid flow, turbine blade rotation, axial or radial orientation and fluid pressure have been utilized throughout the various invention embodiments described herein:

A forward or upstream zone of an abradable surface;
B aft or downstream zone of an abradable surface, which is oriented axially downstream of the forward or upstream zone (A) and any intermediate zone (I);
C-C abradable cross section;
$D_G$ abradable groove depth;
F flow direction through turbine engine;
G turbine blade-tip to abradable surface gap;
$G_W$ worn turbine blade tip to abradable surface gap;
$H_R$ abradable ridge height;
I intermediate zone of an abradable surface, which is oriented axially downstream of the forward or upstream zone (A), and which precedes the downstream zone (B);
L turbine blade-tip leakage;
P abradable surface plan view or plan form;
R turbine blade rotational direction;
$R_1$ Row 1 of the turbine engine turbine section;
$R_2$ Row 2 of the turbine engine turbine section;
$S_R$ abradable ridge centerline spacing;
T turbine blade mid-chord cutoff point or corresponding radially opposed abradable pattern transition
$W_G$ abradable groove width;
$W_R$ abradable ridge width;
$\alpha$ a abradable ridge or groove plan form angle relative to the turbine engine axial dimension or rotor/blade rotation axis;
$\beta$ abradable ridge sidewall angle relative to vertical or normal abradable surface;
$\gamma$ abradable groove fore-aft tilt angle relative to abradable ridge height;
$\Delta A$ abradable groove skew angle relative to abradable ridge longitudinal axis;
$\epsilon$ abradable upper groove tilt angle relative to abradable surface and/or ridge surface;
$\Phi$ abradable groove arcuate angle; and
$\Omega$ turbine blade tip geometrical reference angles defined by the blade tip contour, relative to the turbine engine axial dimension or rotor/blade rotation axis.

DETAILED DESCRIPTION

Embodiments described herein can be readily utilized in abradable components for turbine engines, including gas turbine engines. In various embodiments, turbine casing abradable components, with upstream and downstream ends, have distinct axially varying zones of: (i) composite multi orientation groove and vertically projecting ridges; or (ii) non-directional projecting dimples, or (iii) non-directional, varying-porosity formed depression/hole plan form patterns; or combinations of (i)-(iii); to reduce, redirect and/or block blade tip airflow leakage from the turbine blade airfoil high to low pressure sides. Non-directional arrays of projecting dimples or varying porosity zones (e.g., porosity variance through use of holes or depressions in the abradable surface in order to reduce cross-sectional density and/or flexure) are potentially less susceptible to combustion gas erosion than formed projecting ridge and groove structures. Dimples or depressions are also compatible with a wide range of turbine blade tip contours because they do not have a pre-formed ridge/groove angular orientation. Generally is preferable to align ridge/groove orientation locally with the corresponding local blade-tip plan form camber profile. Thus, dimples or depressions in the abradable surface do not need to pattern-matched to the blade camber profile, so that a common dimple/depression profile can be utilized for a range of different blade camber profiles.

Figure 2:
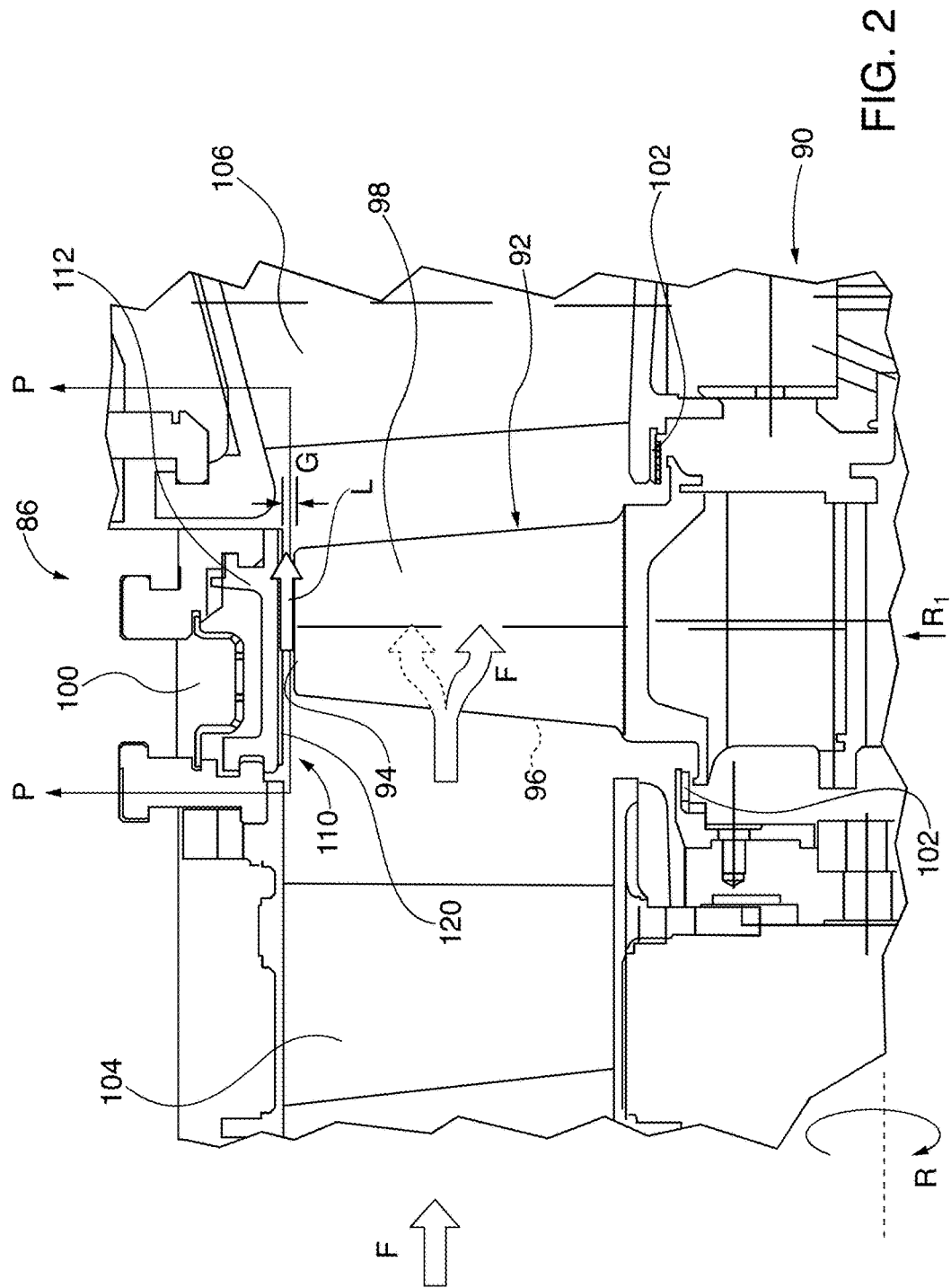
FIG. 2 is a detailed cross sectional elevational view of Row 1 turbine blade and vanes showing blade tip gap G between a blade tip and abradable component of the turbine engine of FIG. 1.
Figure 3:
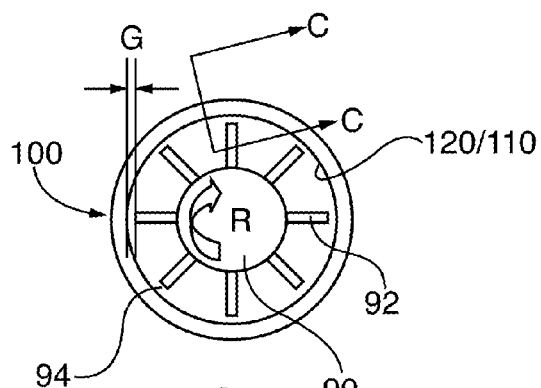
FIG. 3 is a radial cross sectional schematic view of a known turbine engine, with ideal uniform blade tip gap G between all blades and all circumferential orientations about the engine abradable surface.
Figure 4:
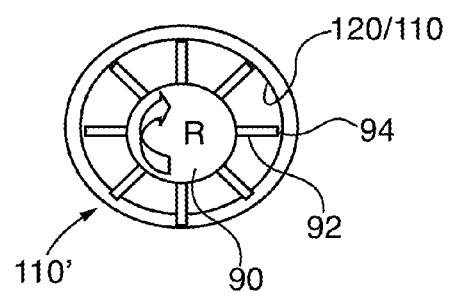
FIG. 4 is a radial cross sectional schematic view of an out of round known turbine engine showing blade tip and abradable surface contact at the 12:00 uppermost and 6:00 lowermost circumferential positions.
Figure 5:
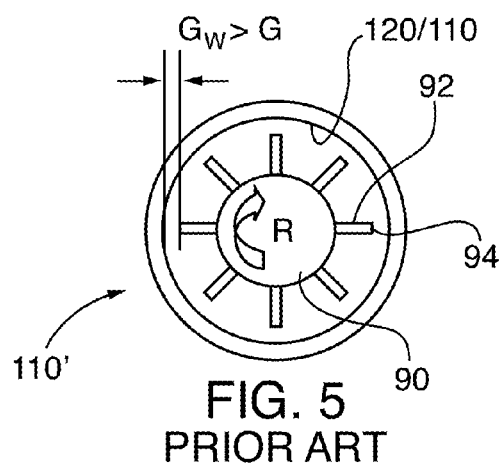
FIG. 5 is a radial cross sectional schematic view of a known turbine engine that has been in operational service with an excessive blade tip gap $G_W$ that is greater than the original design specification blade tip gap G.

Plan form pattern embodiments that include composite multi groove/ridge patterns have distinct forward upstream (zone A) and aft downstream patterns (zone B). Some plan form pattern embodiments have an intermediate or mid pattern (zone I), between the A and B zones. Those combined zone AB or A/I/B ridge/groove array plan forms direct gas flow trapped inside the grooves toward the downstream combustion flow F direction to discourage gas flow leakage in the blade gap G (see FIG. 2) directly from the pressure side of the corresponding, opposed-facing turbine blade airfoil toward the suction side of the airfoil in the localized blade leakage direction L. For convenience, FIG. 40 and its following description herein define exemplary geometrical reference angles defined by the blade tip contour The forward zone is generally defined between the leading edge and the mid chord of the blade airfoil: roughly one third to one half of the total axial length of the airfoil. In some embodiments a mid or intermediate array pattern zone I is oriented axially downstream of the forward zone. The remainder of the array pattern comprises the aft zone B. The mid (I) and aft downstream (B) zone grooves and ridges are angularly oriented opposite the blade rotational direction R. The range of angles is approximately 30% to 120% of the associated turbine blade 92 camber or trailing edge angle.

Plan form pattern zones that incorporate projecting dimple, or varying-porosity formed depression/hole profiles are generally in the fore or forward zone A, while ridge/groove patterns are provided in the intermediate or mid (zone I) and aft or downstream (zone B) axial regions. Ridge porosity can be selectively varied by formation of varying depth and/or diameter holes in the ridge material. Generally, ridge porosity is increased from the axially forward end of the abradable surface to the downstream or aft end of the abradable surface, in order to increase abradability. In various embodiments the ridges and grooves are formed by: (i) known thermal spray of molten particles to build up the surface feature or (ii) known additive layer manufacturing build-up application of the surface feature, such as by 3-D printing, sintering, electron or laser beam deposition or (iii) known ablative removal of substrate material manufacturing processes, defining the feature by portions that were not removed.

In various embodiments, the thermally sprayed ceramic/metallic abradable layers of abradable components are constructed with vertically projecting ridges or ribs having first lower and second upper wear zones. The ridge first lower zone, proximal the thermally sprayed abradable surface, is constructed to optimize engine airflow characteristics with plan form arrays and projections tailored to reduce, redirect and/or block blade tip airflow leakage into grooves between ridges. In some embodiments the upper wear zone of the thermally sprayed abradable layer is approximately ⅓-⅔ of the lower wear zone height or the total ridge height. Ridges and grooves are constructed in the thermally sprayed abradable layer with varied symmetrical and asymmetrical cross sectional profiles and plan form arrays to redirect blade-tip leakage flow and/or for ease of manufacture. In some embodiments the groove widths are approximately ⅓-⅔ of the ridge width or of the lower ridge width (if there are multi width stacked ridges).

In various embodiments, the lower zones of the ridges are also optimized to enhance the abradable component and surface mechanical and thermal structural integrity, thermal resistance, thermal erosion resistance and wear longevity. The ridge upper zone is formed above the lower zone and is optimized to minimize blade tip gap and wear by being more easily abradable than the lower zone. Various embodiments of the thermally sprayed abradable layer abradable component afford easier abradability of the upper zone with upper sub ridges or nibs having smaller cross sectional area than the lower zone rib structure. In some embodiments, the upper sub ridges or nibs are formed to bend or otherwise flex in the event of minor blade tip contact and wear down and/or shear off in the event of greater blade tip contact. In other embodiments the upper zone sub ridges or nibs are pixelated into arrays of upper wear zones, or hole arrays of varying depth/diameter are formed in the rib, so that only those nibs in localized contact with one or more blade tips are worn while others outside the localized wear zone remain intact. While upper zone portions of the ridges are worn away, they cause less blade tip wear than prior known monolithic ridges. In embodiments of the invention as the upper zone ridge portion is worn away, the remaining lower ridge portion preserves engine efficiency by controlling blade tip leakage. In the event that the localized blade tip gap is further reduced, the blade tips wear away the lower ridge portion at that location. However, the relatively higher ridges outside that lower ridge portion localized wear area maintain smaller blade tip gaps to preserve engine performance efficiency. More than two layered wear zones (e.g., upper, middle, and lower wear zones) can be employed in an abradable component constructed in accordance with embodiments of the invention.

In some embodiments, the ridge and groove profiles and plan form arrays in the thermally sprayed abradable layer are tailored locally or universally throughout the abradable component by forming multi-layer grooves with selected orientation angles and/or cross sectional profiles chosen to reduce blade tip leakage and vary ridge cross section. In some embodiments, the abradable component surface plan form arrays and profiles of ridges and grooves provide enhanced blade tip leakage airflow control yet also facilitate simpler manufacturing techniques than known abradable components.

In some embodiments the abradable components and their abradable surfaces are constructed of multi-layer thermally sprayed ceramic material of known composition and in known layer patterns/dimensions on a metal support layer. In embodiments the ridges are constructed on abradable surfaces by known additive processes that thermally spray (without or through a mask), layer print or otherwise apply ceramic or metallic/ceramic material to a metal substrate (with or without underlying additional support structure). Grooves are defined in the voids between adjoining added ridge structures. In other embodiments grooves are constructed by abrading or otherwise removing material from the thermally sprayed substrate using known processes (e.g., machining, grinding, water jet or laser cutting or combinations of any of them), with the groove walls defining separating ridges. Combinations of added ridges and/or removed material grooves may be employed in embodiments described herein. The abradable component is constructed with a known support structure adapted for coupling to a turbine engine casing and known abradable surface material compositions, such as a bond coating base, thermal coating and one or more layers of heat/thermal resistant top coating. For example, the upper wear zone can be constructed from a thermally sprayed abradable material having different composition and physical properties than another thermally sprayed layer immediately below it or other sequential layers.

Various thermally sprayed, metallic support layer abradable component ridge and groove profiles and arrays of grooves and ridges described herein can be combined to satisfy performance requirements of different turbine applications, even though not every possible combination of embodiments and features of the invention is specifically described in detail herein.

Abradable Surface Plan Forms

Exemplary embodiment abradable surface ridge and groove plan form patterns are shown in FIGS. 12-19, 21-34, 38, and 43-46. Some of the ridge and groove patterns on the abradable surface are combined with pattern arrays of non-directional, discontinuous vertically projecting dimples or other discrete micro surface feature (MSF) structures that allow air circulation between the spaced structures. Exemplary MSF structures, and their methods for formation, are described in the aforementioned priority document PCT/US2015/016271, filed Feb. 18, 2014, "TURBINE ABRADABLE LAYER WITH AIRFLOW DIRECTING PIXELATED SURFACE FEATURE PATTERNS", which is incorporated by reference in its entirety herein. Where applied on an abradable surface, discontinuous micro surface features (MSF), balance desirable abradable surface/blade tip sealing in the gap, reduction in the tendency for abradable surface coating spallation and increased potential longevity of coating systems. The MSFs help balance turbine operational efficiency with longer potential operational time between scheduled service outages. These balanced, combined attributes potentially help achieve a more sustainable and temperature resistant abradable coating system for use in industrial gas turbines. In other embodiments, some of the ridge and groove patterns on the abradable surface are combined with varying porosity, cross sectional area density varying or surface flexure varying, depressions or holes.

The embodiments shown in FIGS. 12-19, 21, 22, 30, and 43-46 have hockey stick-like plan form patterns. In the hockey stick-like embodiments of FIGS. 12-19, 21, 22, 30, and 44-45 the forward upstream zone A grooves and ridges are aligned generally perpendicular to the axial front face of the turbine ring segment/abradable surface. The zone A grooves and ridges are also parallel (+/−10%) to the overall combustion gas axial flow direction F within the turbine 80 (see FIG. 1), which is also generally parallel to the rotor/turbine blade rotational axis as well as the abradable support surface curvature central axis that is also parallel to the blade rotational axis. The aft downstream zone B grooves and ridges are angularly oriented opposite the blade rotational direction R. The range of angles is approximately 30% to 120% of the associated turbine blade 92 camber or trailing edge angle. For design convenience the downstream angle selection can be selected to match any of the turbine blade high or low pressure averaged (linear average line) side wall surface or camber angle (see, e.g., angle $\alpha_{B2}$ of FIG. 14 on the high pressure side, commencing at the zone B starting surface and ending at the blade trailing edge), the trailing edge angle (see, e.g., angle $\alpha_{B1}$ of FIG. 15); the angle matching connection between the leading and trailing edges (see, e.g., angle $\alpha_{B1}$ of FIG. 14); or any angle between such blade geometry established angles, such as $\alpha_{B3}$. Hockey stick-like ridge and groove array plan form patterns are as relatively easy to form on an abradable surface as the purely horizontal or diagonal known plan form array patterns, but in fluid flow simulations the hockey stick-like patterns have less blade tip leakage than either of those known unidirectional plan form patterns. The hockey stick-like patterns are formed by known cutting/abrading or additive layer building methods that have been previously used to form known abradable component ridge and groove patterns.

In FIG. 12, the abradable component 160 has forward ridges/ridge tips 162A/164A and grooves 168A that are oriented at angle $\alpha_A$ within +/−10 degrees relative to the axial turbine axial flow direction F. The aft ridges/ridge tips 162B/164B and grooves 168B are oriented at an angle $\alpha_B$ that is approximately the turbine blade 92 trailing edge angle. As shown schematically in FIG. 12, the forward ridges 162A block the forward zone A blade leakage direction and the rear ridges 162B block the aft zone B blade leakage L. Horizontal spacer ridges 169 are periodically oriented axially across the entire blade 92 footprint and about the circumference of the abradable component surface 167, in order to block and disrupt blade tip leakage L, but unlike known design flat, continuous surface abradable surfaces reduce potential surface area that may cause blade tip contact and wear.

The abradable component 170 embodiment of FIG. 13 is similar to that of FIG. 12, with the forward portion ridges 172A/174A and grooves 178A oriented generally parallel to the turbine combustion gas flow direction F while the rear ridges 172B/174B and grooves 178B are oriented at angle $\alpha_B$ that is approximately equal to that formed between the pressure side of the turbine blade 92 starting at zone B to the blade trailing edge. As with the embodiment of FIG. 12, the horizontal spacer ridges 179 are periodically oriented axially across the entire blade 92 footprint and about the circumference of the abradable component surface 167, in order to block and disrupt blade tip leakage L.

The abradable component 180 embodiment of FIG. 14 is similar to that of FIGS. 12 and 13, with the forward portion ridges 182A/184A and grooves 188A oriented generally parallel to the turbine combustion gas flow direction F while the rear ridges 182B/184B and grooves 188B are selectively oriented at any of angles $\alpha_{B1}$ to $\alpha_{B3}$. Angle $\alpha_{B1}$ is the angle formed between the leading and trailing edges of blade 92. As in FIG. 13, angle $\alpha_{B2}$ is approximately parallel to the portion of the turbine blade 92 high-pressure sidewall that is in opposed relationship with the aft zone B. As shown in FIG. 14 the rear ridges 182B/184B and grooves 188B are actually oriented at angle $\alpha_{B3}$, which is an angle that is roughly 50% of angle $\alpha_{B2}$. As with the embodiment of FIG. 12, the horizontal spacer ridges 189 are periodically oriented axially across the entire blade 92 footprint and about the circumference of the abradable component surface 187, in order to block and disrupt blade tip leakage L.

In the abradable component 190 embodiment of FIG. 15 the forward ridges 192A/194A and grooves 198A and angle $\alpha_A$ are similar to those of FIG. 14, but the aft ridges 192B/194B and grooves 198B have narrower spacing and widths than FIG. 14. The alternative angle $\alpha_{B1}$ of the aft ridges 192B/194B and grooves 198B shown in FIG. 15 matches the trailing edge angle of the turbine blade 92, as does the angle $\alpha_B$ in FIG. 12. The actual angle $\alpha_{B2}$ is approximately parallel to the portion of the turbine blade 92 high-pressure sidewall that is in opposed relationship with the aft zone B, as in FIG. 13. The alternative angle $\alpha_{B3}$ and the horizontal spacer ridges 199 match those of FIG. 14, though other arrays of angles or spacer ridges can be utilized.

Figure 16:
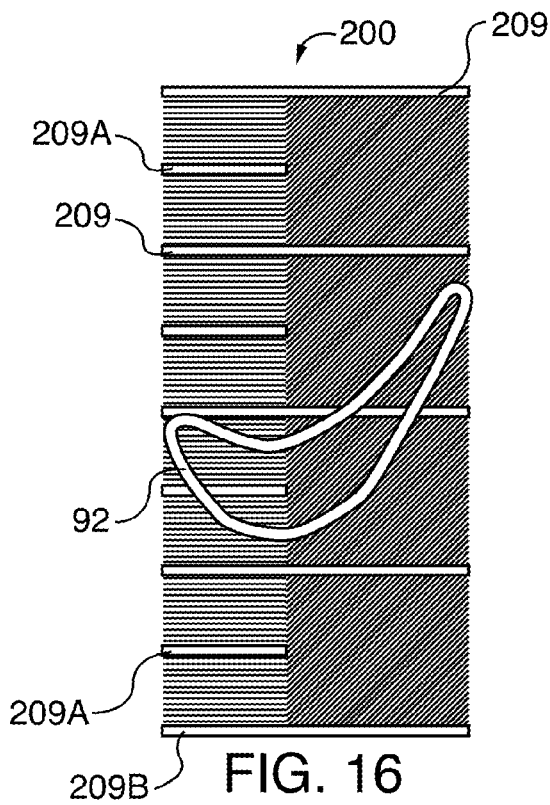
Figure 17:
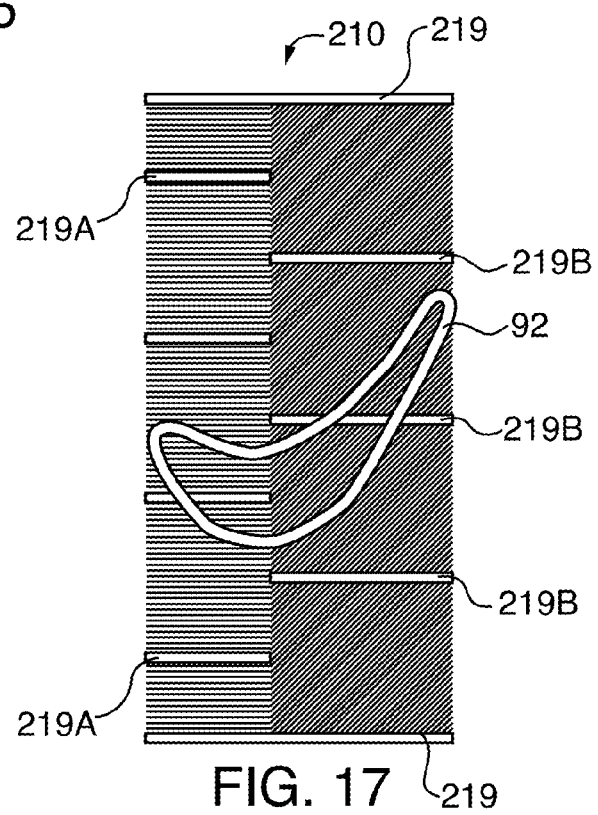

Alternative spacer ridge patterns are shown in FIGS. 16 and 17. In the embodiment of FIG. 16, the abradable component 200 incorporates an array of full-length spacer ridges 209 that span the full axial footprint of the turbine blade 92 and additional forward spacer ridges 209A that are inserted between the full-length ridges. The additional forward spacer ridges 209A provide for additional blockage or blade tip leakage in the blade 92 portion that is proximal the leading edge. In the embodiment of FIG. 17, the abradable component 210 has a pattern of full-length spacer ridges 219 and circumferentially staggered arrays of forward spacer ridges 219A and aft spacer ridges 219B. The circumferentially staggered ridges 219A/B provide for periodic blocking or disruption of blade tip leakage as the blade 92 sweeps the abradable component 210 surface, without the potential for continuous contact throughout the sweep that might cause premature blade tip wear.

While arrays of horizontal spacer ridges have been previously discussed, other embodiments of the invention include vertical spacer ridges. More particularly the abradable component 220 embodiment of FIGS. 18 and 19 incorporate forward ridges 222A between which are groove 228A. Those grooves are interrupted by staggered forward vertical ridges 223A that interconnect with the forward ridges 222A. The vertical As is shown in FIG. 18 the staggered forward vertical ridges 223A form a series of diagonal arrays sloping downwardly from left to right. A full-length vertical spacer ridge 229 is oriented in a transitional zone T between the forward zone A and the aft zone B. The aft ridges 222B and grooves 228B are angularly oriented, completing the hockey stick-like plan form array with the forward ridges 222A and grooves 228A. Staggered rear vertical ridges 223B are arrayed similarly to the forward vertical ridges 223A. The vertical ridges 223A/B and 229 disrupt generally axial airflow leakage across the abradable component 220 grooves from the forward to aft portions that otherwise occur with uninterrupted full-length groove embodiments of FIGS. 12-17, but at the potential disadvantage of increased blade tip wear at each potential rubbing contact point with one of the vertical ridges. Staggered vertical ridges 223A/B as a compromise periodically disrupt axial airflow through the grooves 228A/B without introducing a potential 360 degree rubbing surface for turbine blade tips. Potential 360 degree rubbing surface contact for the continuous vertical ridge 229 can be reduced by shortening that ridge vertical height relative to the ridges 222A/B or 223 A/B, but still providing some axial flow disruptive capability in the transition zone T between the forward grooves 228A and the rear grooves 228B.

FIG. 20 shows a simulated fluid flow comparison between a hockey stick-like ridge/groove pattern array plan form with continuous grooves (solid line) and split grooves disrupted by staggered vertical ridges (dotted line). The total blade tip leakage mass flux (area below the respective lines) is lower for the split-groove array pattern than for the continuous groove array pattern.

Figure 21:
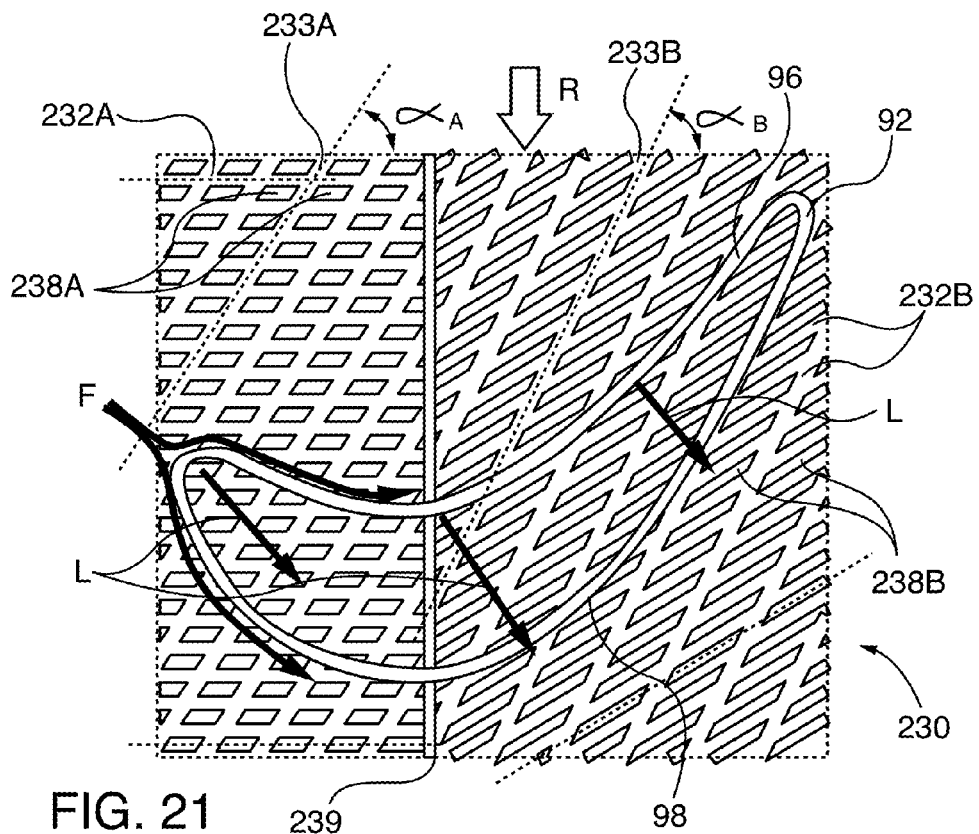
FIG. 21 is a plan or plan form view of another "hockey stick" configuration ridge and groove pattern for an abradable surface, having intersecting ridges and grooves, and a schematic overlay of a turbine blade.

Staggered ridges that disrupt airflow in grooves do not have to be aligned vertically in the direction of blade rotation R. As shown in FIG. 21 the abradable component 230 has patterns of respective forward and aft ridges 232A/B and grooves 238A/B that are interrupted by angled patterns of ridges 233A/B ($\alpha_A$, $\alpha_B$) that connect between successive rows of forward and aft ridges and periodically block downstream flow within the grooves 238 A/B. As with the embodiment of FIG. 18, the abradable component 230 has a continuous vertically aligned ridge 239 located at the transition between the forward zone A and aft zone B. The intersecting angled array of the ridges 232A and 233A/B effectively block localized blade tip leakage L from the high-pressure side 96 to the low-pressure side 98 along the turbine blade axial length from the leading to trailing edges.

It is noted that the spacer ridge 169, 179, 189, 199, 209, 219, 229, 239, etc., embodiments shown in FIGS. 12-19 and 21 may have different relative heights in the same abradable component array and may differ in height from one or more of the other ridge arrays within the component. For example if the spacer ridge height is less than the height of other ridges in the abradable surface it may never contact a blade tip but can still function to disrupt airflow along the adjoining interrupted groove.

Figure 22:
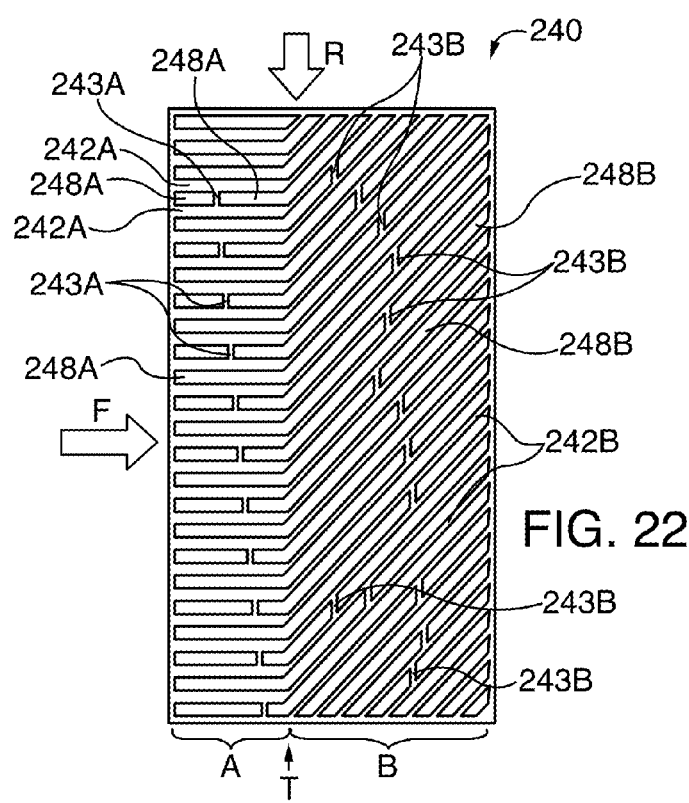
FIG. 22 is a plan or plan form view of another "hockey stick" configuration ridge and groove pattern for an abradable surface, similar to that of FIGS. 18 and 19, which includes vertically oriented ridge arrays that are laterally staggered across the abradable surface in the turbine engine's axial flow direction.
Figure 23:
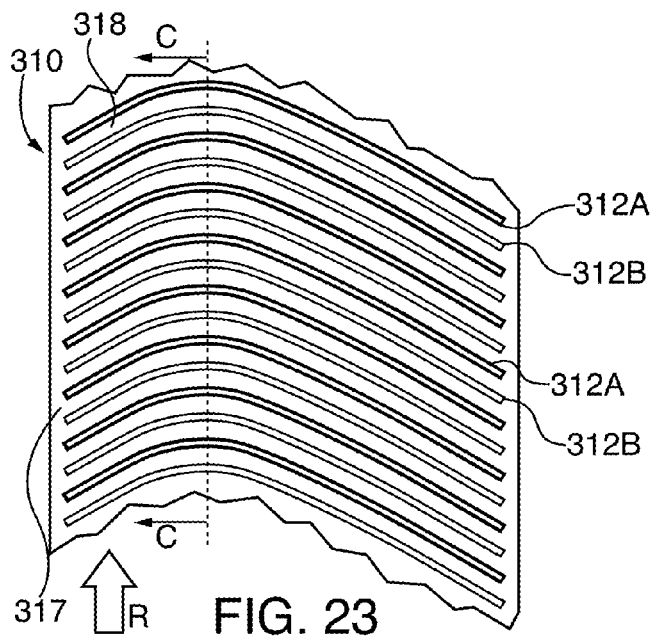
FIG. 23 is a plan or plan form view of a multi height or elevation ridge profile configuration and corresponding groove pattern for an abradable surface, suitable for use in either standard or "fast start" engine modes.
Figure 24:
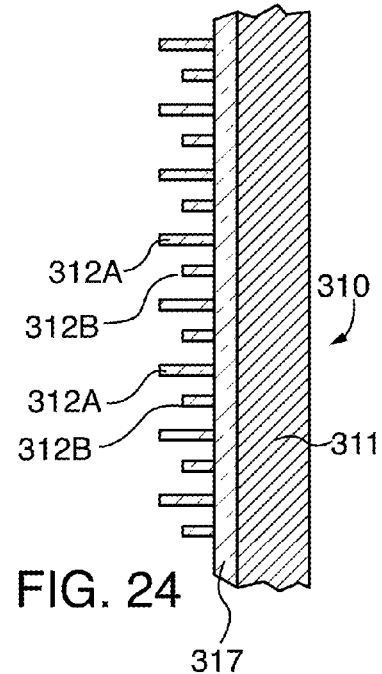
FIG. 24 is a cross sectional view of the abradable surface embodiment of FIG. 23 taken along C-C thereof.

FIG. 22 is an alternative embodiment of a hockey stick-like plan form pattern abradable component 240 that combines the embodiment concepts of distinct forward zone A and aft zone B respective ridge 242 A/B and groove 248A/B patterns which intersect at a transition T without any vertical ridge to split the zones from each other. Thus the grooves 248A/B form a continuous composite groove from the leading or forward edge of the abradable component 240 to its aft most downstream edge (see flow direction F arrow) that is covered by the axial sweep of a corresponding turbine blade. The staggered vertical ridges 243A/B interrupt axial flow through each groove without potential continuous abrasion contact between the abradable surface and a corresponding rotating blade (in the direction of rotation arrow R) at one axial location. However the relatively long runs of continuous straight-line grooves 248A/B, interrupted only periodically by small vertical ridges 243 A/B, provide for ease of manufacture by water jet erosion or other known manufacturing techniques. The abradable component 240 embodiment offers a good subjective design compromise among airflow performance, blade tip wear, and manufacturing ease/cost.

Abradable Surface Porosity and Flexibility Varying Surface Cross Sectional Profiles Exemplary embodiment abradable surface cross sectional profiles are shown in FIGS. 24-29, 31-34 and 38; they include (i) composite multi orientation groove and vertically projecting ridges; or (ii) non-directional, discontinuous patterns of projecting dimples, or (iii) non-directional, discontinuous patterns of varying-porosity formed depression/hole plan form patterns; or combinations of (i)-(iii). Unlike known abradable cross sectional profile patterns that have uniform height across an entire abradable surface, many of the present invention cross sectional profiles formed in the thermally sprayed abradable layer comprise composite multi height/depth ridge and groove patterns that have distinct upper (zone I) and lower (zone II) wear zones. The lower zone II optimizes engine airflow and structural characteristics while the upper zone I minimizes blade tip gap and wear by being more easily abradable than the lower zone. Various embodiments of the abradable component afford easier abradability of the upper zone with upper sub ridges or nibs having smaller cross sectional area than the lower zone rib structure. Cross sectional surface area can be varied selectively through use of formed grooves, depressions, or holes. In some embodiments, the upper sub ridges or nibs are formed to bend or otherwise flex in the event of minor blade tip contact and wear down and/or shear off in the event of greater blade tip contact. In other embodiments, the upper zone sub ridges or nibs are pixelated into arrays of upper wear zones so that only those nibs in localized contact with one or more blade tips are worn while others outside the localized wear zone remain intact. While upper zone portions of the ridges are worn away, they cause less blade tip wear than prior known monolithic ridges and afford greater profile forming flexibility than CMC/FGI abradable component constructions that require profiling around the physical constraints of the composite hollow ceramic sphere matrix orientations and diameters. In embodiments of the invention as the upper zone ridge portion is worn away, the remaining lower ridge portion preserves engine efficiency by controlling blade tip leakage. In the event that the localized blade tip gap is further reduced, the blade tips wear away the lower ridge portion at that location. However, the relatively higher ridges outside that lower ridge portion localized wear area maintain smaller blade tip gaps to preserve engine performance efficiency.

With the progressive wear zones, construction of some embodiments of the invention blade tip gap G can be reduced from previously acceptable known dimensions. For example, if a known acceptable blade gap G design specification is 1 mm the higher ridges in wear zone I can be increased in height so that the blade tip gap is reduced to 0.5 mm. The lower ridges that establish the boundary for wear zone II are set at a height so that their distal tip portions are spaced 1 mm from the blade tip. In this manner a 50% tighter blade tip gap G is established for routine turbine operation, with acceptance of some potential wear caused by blade contact with the upper ridges in zone I. Continued localized progressive blade wearing in zone II will only be initiated if the blade tip encroaches into the lower zone, but in any event, the blade tip gap G of 1 mm is no worse than known blade-tip gap specifications. In some exemplary embodiments the upper zone I height is approximately ⅓ to ⅔ of the lower zone II height.

Figure 25:
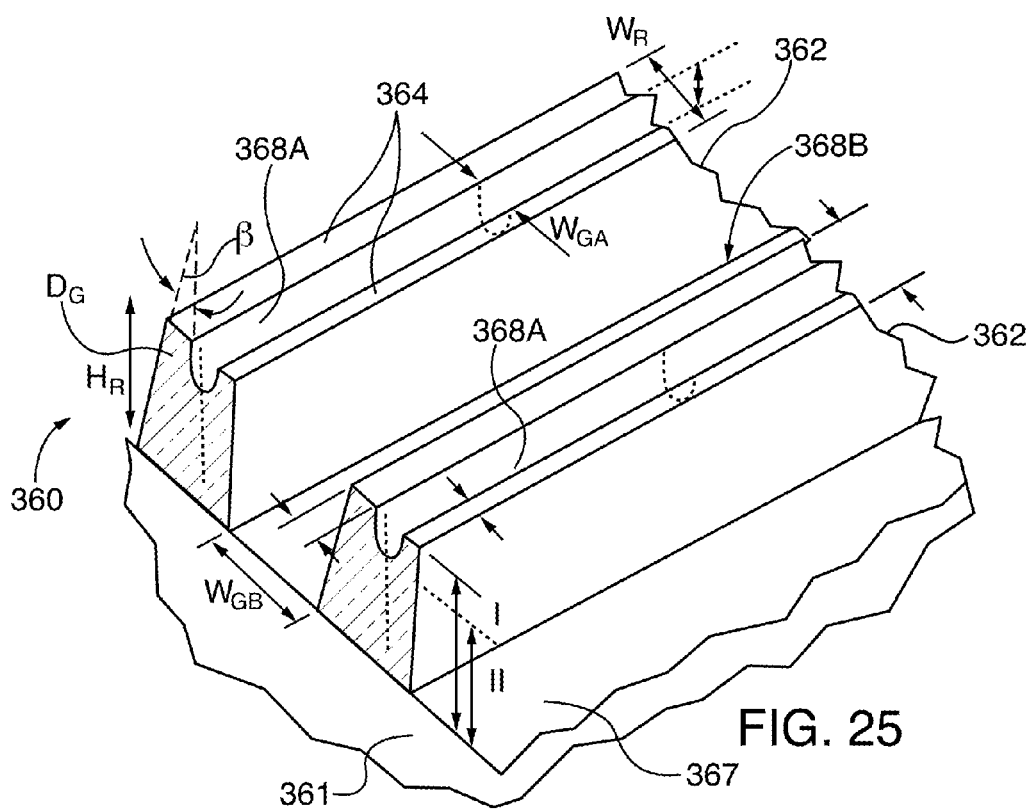
FIG. 25 is a perspective view of an inwardly inclined, symmetric sidewall profile ridge configuration and multi depth parallel groove profile pattern for an abradable surface.

Progressive wear zones can be incorporated in asymmetric ribs or any other rib profile by cutting grooves or holes into the ribs, so that remaining upstanding rib material flanking the groove cut or hole has a smaller horizontal cross sectional area than the remaining underlying rib. Groove orientation and profile may also be tailored to enhance airflow characteristics of the turbine engine by reducing undesirable blade tip leakage, is shown in the embodiment of FIG. 25. In this manner, the thermally sprayed abradable component surface is constructed with both enhanced airflow characteristics and reduced potential blade tip wear, as the blade tip only contacts portions of the easier to abrade upper wear zone I. The lower wear zone II remains in the lower rib structure below the groove depth. Other exemplary embodiments of abradable component ridge and groove profiles used to form progressive wear zones are now described. Structural features and component dimensional references in these additional embodiments that are common to previously described embodiments are identified with similar series of reference numbers and symbols without further detailed description.

FIG. 25 shows an abradable component 360 having an inclined, symmetric sidewall rib, cross sectional profile abradable component with inclusion of dual level grooves 368A formed in the ridge tips 364 and 368B formed between the ridges 362 to the substrate surface 367. The upper grooves 368A form shallower depth $D_G$ lateral ridges that comprise the wear zone I while the remainder of the ridge 362 below the groove depth comprises the lower wear zone II. In this abradable component embodiment 360, the upper grooves 368A are oriented parallel to the ridge 362 longitudinal axis and are normal to the ridge tip 364 surface, but other groove orientations, profiles and depths may be employed to optimize airflow control and/or minimize blade tip wear.

Figure 26:
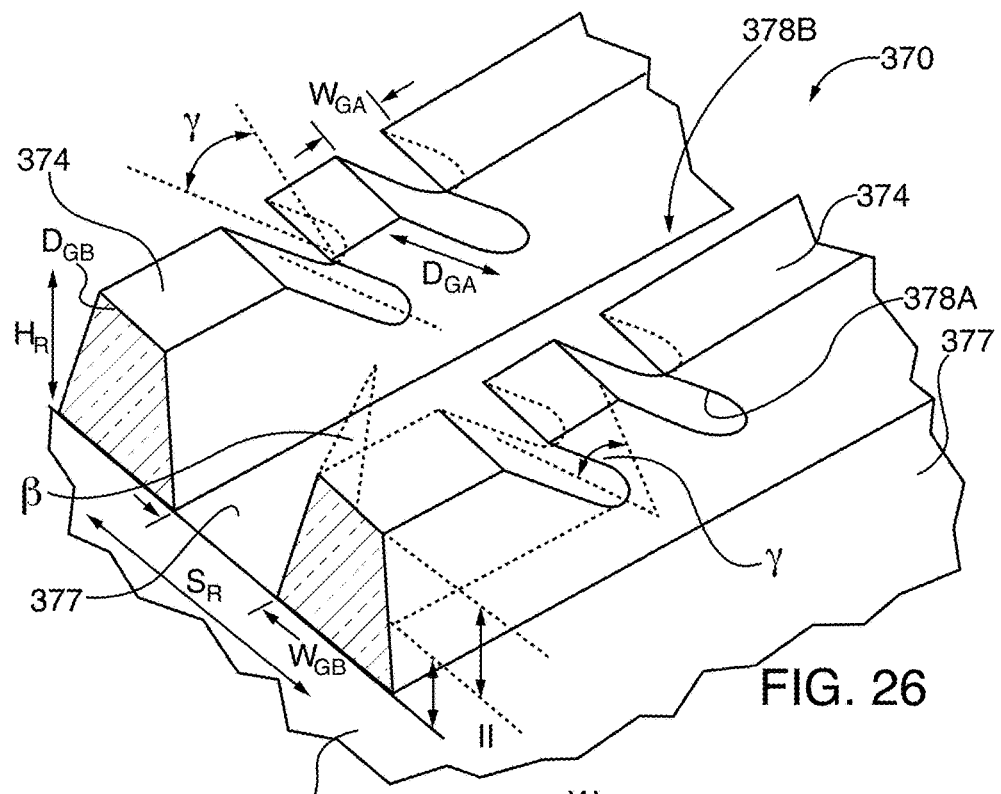
FIG. 26 is a perspective view of an inwardly inclined, symmetric sidewall profile ridge configuration and multi depth intersecting groove profile pattern for an abradable surface, wherein upper grooves are tipped longitudinally relative to the ridge tip.

In the abradable component 370 embodiment of FIG. 26, a plurality of upper grooves 378A are tilted fore-aft relative to the ridge tip 374 at angle γ, depth $D_{GA}$ and have parallel groove sidewalls. Upper wear zone I is established between the bottom of the groove 378A and the ridge tip 374 and lower wear zone II is below the upper wear zone down to the substrate surface 377. In the alternative embodiment of FIG. 27, the abradable component 380 has upper grooves 388A with rectangular profiles that are skewed at angle A relative to the ridge 382 longitudinal axis and its sidewalls 385/386. The upper groove 388A as shown is also normal to the ridge tip 384 surface. The upper wear zone I is above the groove depth $D_{GA}$ and wear zone II is below that groove depth down to the substrate surface 387. For brevity, the remainder of the structural features and dimensions are labelled in FIGS. 26 and 27 with the same conventions as the previously described abradable surface profile embodiments and has the same previously described functions, purposes, and relationships.

Figure 28:
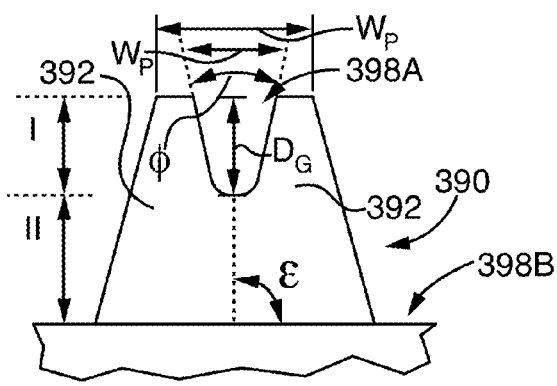
FIG. 28 is an elevational cross sectional view of cross sectional view of a multi depth, parallel groove profile configuration in an inwardly inclined, symmetric sidewall profile ridge for an abradable surface.

As shown in FIG. 28, upper grooves do not have to have parallel sidewalls and may be oriented at different angles relative to the ridge tip surface. In addition, upper grooves may be utilized in ridges having varied cross sectional profiles. The ridges of the abradable component embodiment 390 have symmetrical sidewalls that converge in a ridge tip. As in previously described embodiments having dual height grooves, the respective upper wear zones I are from the ridge tip to the bottom of the groove depth $D_G$ and the lower wears zones II are from the groove bottom to the substrate surface. In FIG. 28, the upper groove 398A is normal to the substrate surface (ε=90°) and the groove sidewalls diverge at angle Φ. For brevity, the remainder of the structural features and dimensions are labelled in FIG. 28, with the same conventions as the previously described abradable surface profile embodiments and has the same previously described functions, purposes, and relationships.

Figure 29:
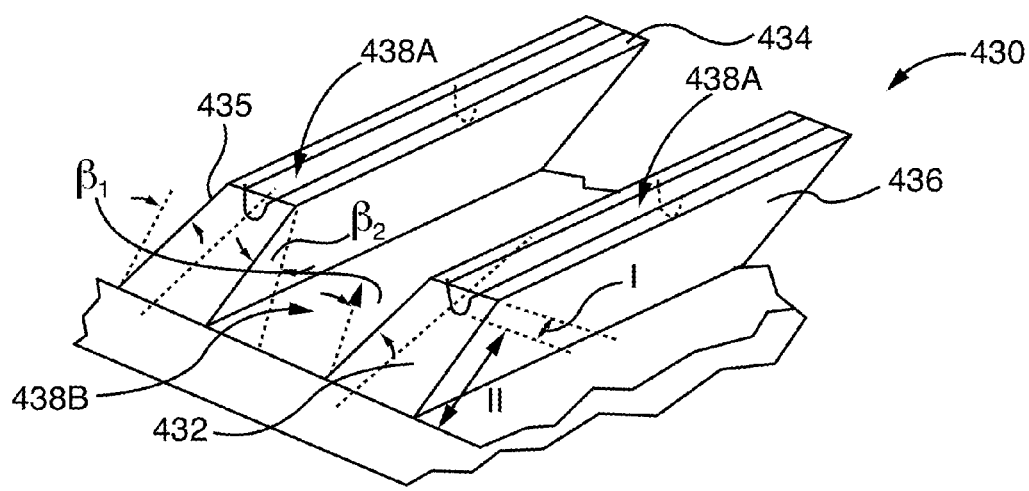
FIG. 29 is a perspective view of an abradable surface, having asymmetric, non-parallel wall ridges and multi depth grooves.

In FIG. 29, the abradable ridge embodiment shown has a trapezoidal cross sectional profile. The ridge tip upper grooves can be selectively formed in various orientations, for selective airflow control, while also having selective upper and lower wear zones. In FIG. 29, the abradable component 430 embodiment has an array of ridges 432 with asymmetric cross sectional profiles, separated by lower grooves 438B. Each ridge 432 has a first sidewall 435 sloping at angle $β_1$ and a second sidewall 436 sloping at angle $β_2$. Each ridge 432 has an upper groove 438A that is parallel to the ridge longitudinal axis and normal to the ridge tip 434. The depth of upper groove 438A defines the lower limit of the upper wear zone I and the remaining height of the ridge 432 defines the lower wear zone II.

Figure 27:
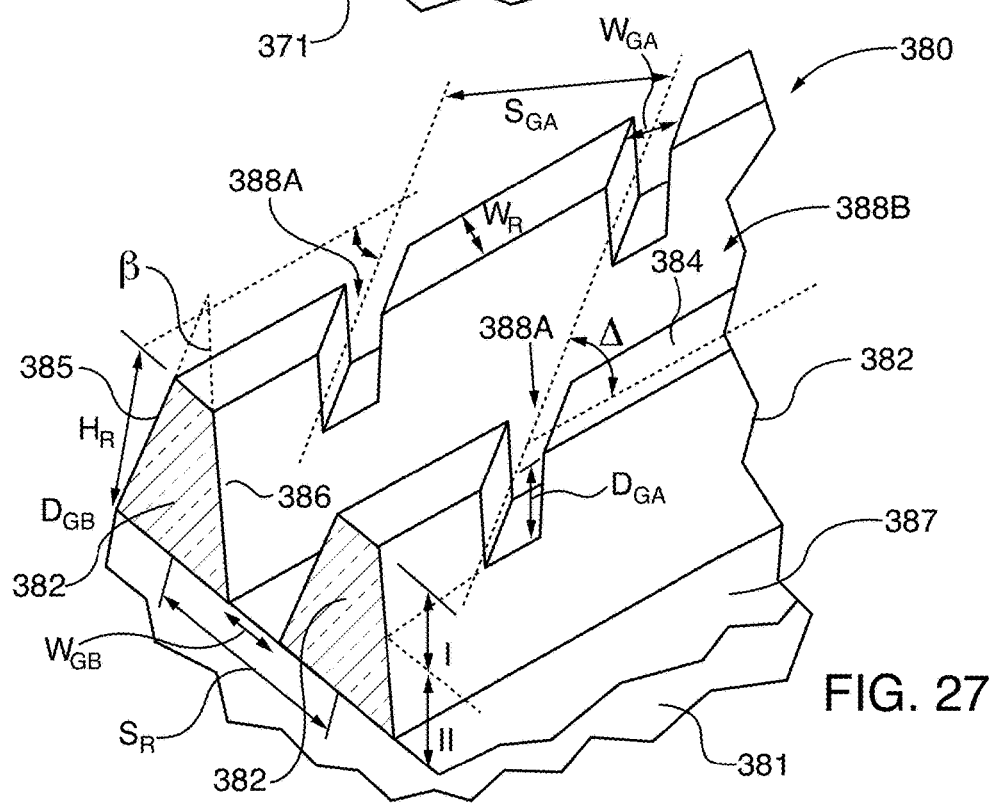
FIG. 27 is a perspective view of an inwardly inclined, symmetric sidewall profile ridge configuration and multi depth intersecting groove profile pattern for an abradable surface, wherein upper grooves are normal to and skewed longitudinally relative to the ridge tip.
Figure 30:
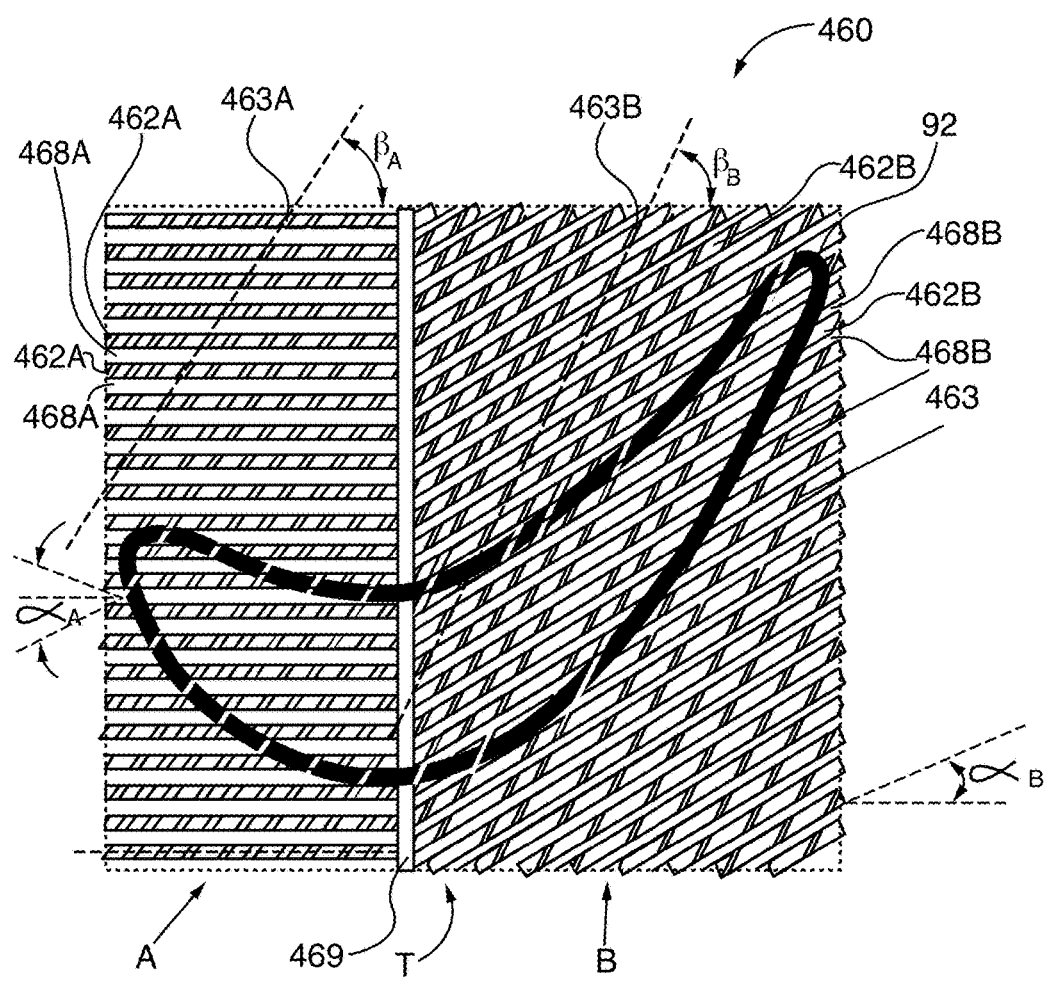
FIG. 30 is a plan or plan form view of a multi-level intersecting groove pattern for an abradable surface.

FIG. 30 shows an abradable component 460 plan form incorporating multi-level grooves and upper/lower wear zones, with forward A and aft B ridges 462A/462B separated by lower grooves 468A/B that are oriented at respective angles $α_{A/B}$. Arrays of fore and aft upper partial depth grooves 463A/B of the type shown in the embodiment of FIG. 27 are formed in the respective arrays of ridges 462A/B and are oriented transverse the ridges and the full depth grooves 468A/B at respective angles $β_{A/B}$. The upper partial depth grooves 463A/B define the vertical boundaries of the abradable component 460 upper wear zones I, with the remaining portions of the ridges below those partial depth upper grooves defining the vertical boundaries of the lower wear zones.

Figure 31:
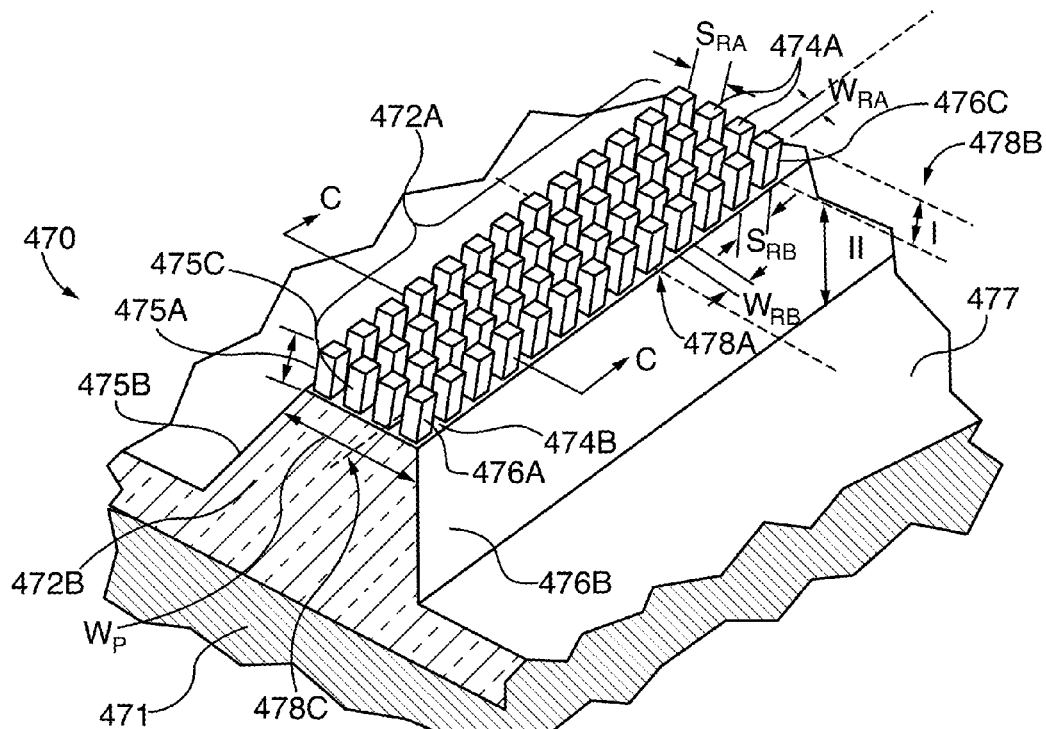
FIG. 31 is a perspective view of a stepped profile abradable surface ridge, wherein the upper level ridge has an array of pixelated upstanding nibs projecting from the lower ridge plateau.
Figure 32:
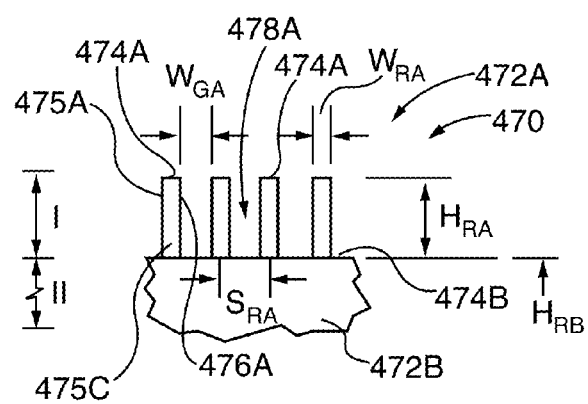
FIG. 32 is an elevational view of a row of pixelated upstanding nibs projecting from the lower ridge plateau, taken along C-C of FIG. 31.

With thermally sprayed abradable component construction, porosity or abradability of the abradable surface is selectively varied locally through use of vertically projecting micro ribs or nibs, as shown in FIGS. 31-32. Alternatively, porosity or abradability can be varied locally through use of holes or depressions formed into otherwise monolithic rib structures, as shown in FIGS. 33 and 34.

More specifically, referring to FIGS. 31 and 32, the cross sections and heights of upper wear zone I thermally sprayed abradable material is configured to conform to different degrees of blade tip intrusion by defining arrays of micro ribs or nibs on top of ridges, without the aforementioned geometric limitations of forming grooves around hollow ceramic spheres in CMC/FGI abradable component constructions. The abradable component 470 includes a previously described metallic support surface 471, with arrays of lower grooves and ridges forming a lower wear zone II. Specifically the lower ridge 472B has sidewalls 475B and 476B that terminate in a ridge plateau 474B. Lower grooves 478B are defined by the ridge sidewalls 475B and 476B and the substrate surface 477. Micro ribs or nibs 472A are formed on the lower ridge plateau 474B by known additive processes or by forming an array of intersecting grooves 478A and 478C within the lower ridge 472B, without any hollow sphere integrity preservation geometric constraints that would otherwise be imposed in a CMC/FGI abradable component design. In the embodiment of FIG. 31, the nibs 472A have square or other rectangular cross section, defined by upstanding sidewalls 475A, 475C, 476A, and 476C that terminate in ridge tips 474A of common height. Other nib 472A cross sectional plan form shapes can be utilized, including by way of example trapezoidal or hexagonal cross sections. Nib arrays including different localized cross sections and heights can also be utilized.

Nib 472A and groove 478A/C dimensional boundaries are identified in FIGS. 31 and 32, consistent with those described in the prior embodiments. Generally nib 472A height $H_{RA}$ ranges from approximately 20%-100% of the blade tip gap G or from approximately ⅓-⅔ the total ridge height of the lower ridge 472B and the nibs 472A. Nib 472A cross section ranges from approximately 20% to 50% of the nib height $H_{RA}$. Nib material construction and surface density (quantified by centerline spacing $S_{RA/B}$ and groove width $W_{GA}$) are chosen to balance abradable component 470 wear resistance, thermal resistance, and structural stability and airflow characteristics. For example, a plurality of small width nibs 472A produced in a controlled density thermally sprayed ceramic abradable offers high leakage protection to hot gas. These can be at high incursion prone areas only or the full engine set. It is suggested that where additional sealing is needed this is done via the increase of plurality of the ridges maintaining their low strength and not by increasing the width of the ridges. Typical nib centerline spacing $S_{RA/B}$ or nib 472A structure and array-pattern density selection enables the pixelated nibs to respond in different modes to varying depths of blade tip 94 incursions.

Figure 33:
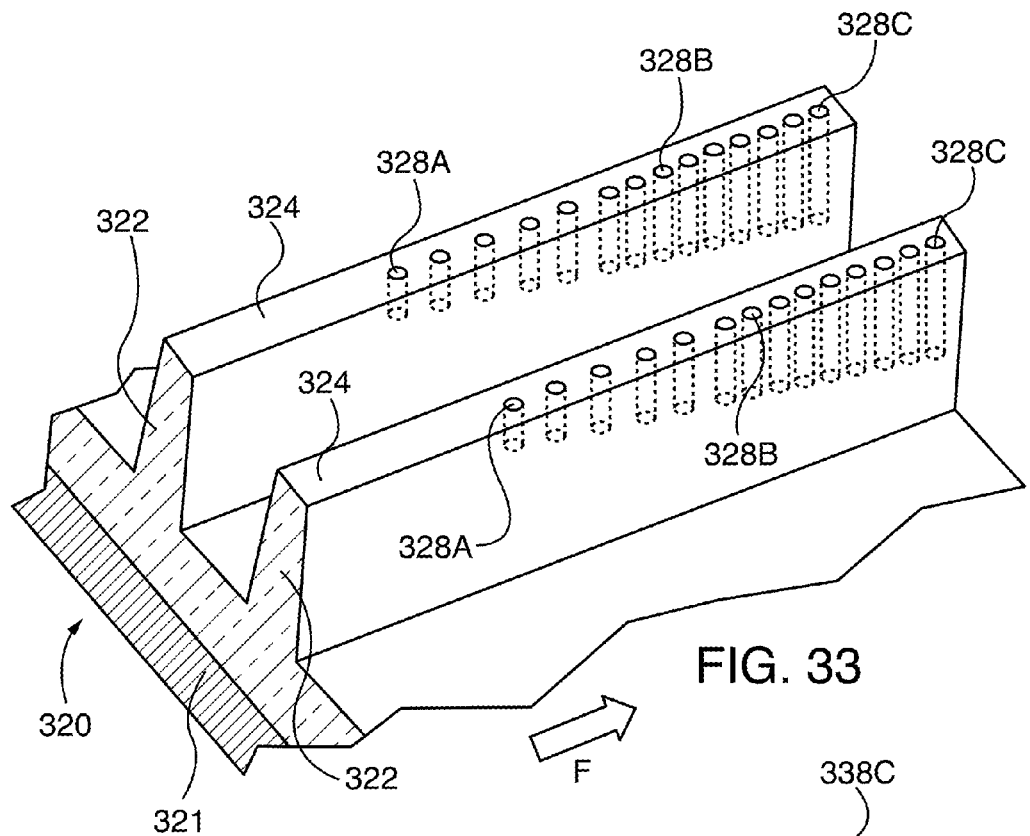
FIG. 33 is a perspective view of an abradable ridge and groove pattern, with arrays of holes of varying depth formed in the abradable ridge, for selectively varying the abradable layer cross sectional surface area, or porosity, or abradability, in accordance with an exemplary embodiment of the invention.
Figure 34:
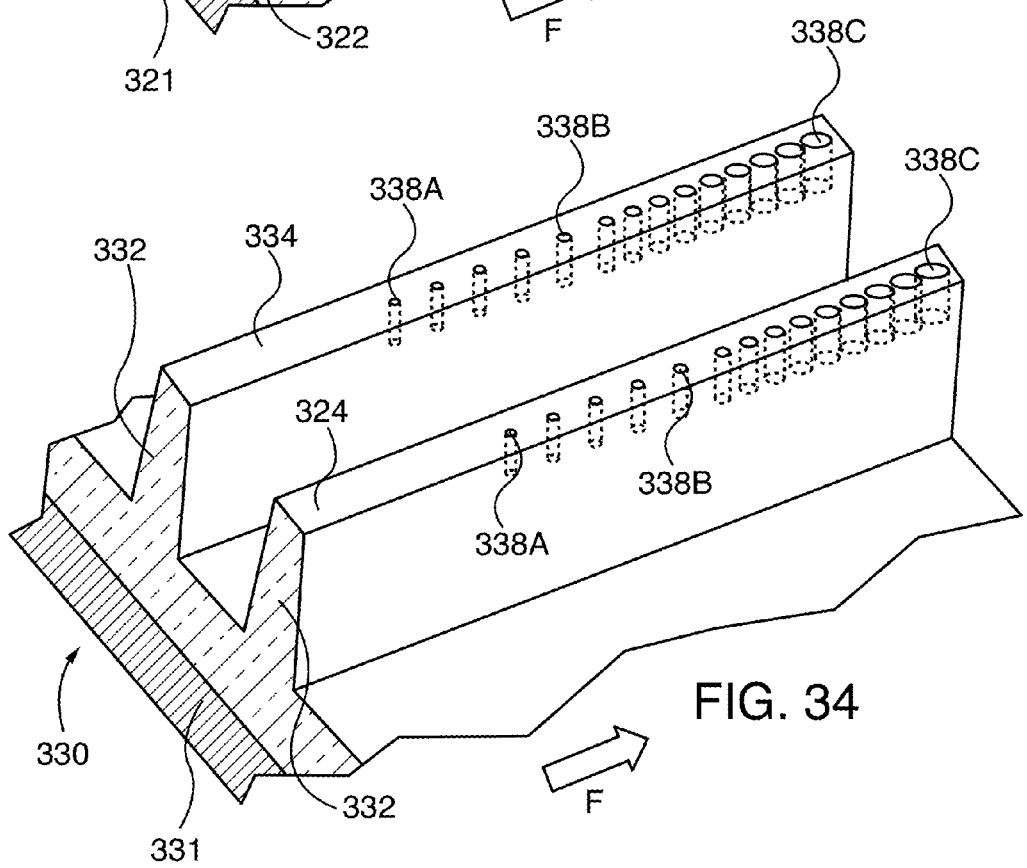
FIG. 34 is a perspective view of an abradable ridge and groove pattern, with arrays of holes of varying diameter formed in the abradable ridge, for selectively varying the abradable layer cross sectional surface area, or porosity, or abradability, in accordance with an exemplary embodiment of the invention.

In the embodiments of FIGS. 33 and 34, localized porosity or abradability is varied through use of holes or dimple depressions formed into otherwise monolithic rib structures. For example, abradable porosity within a rib is varied locally by changing any one or more of hole/depression depth, diameter, array pitch density, and/or volume. In FIG. 33, the abradable component 320 includes support surface 321, to which is affixed ribs 322. The top surface 324 of the rib 322 has an array of varying-depth holes 328A/B/C, which as shown increase depth axially downstream from hole 328A to 328B to 328C along the hot working gas flow direction F. Generally, the deeper drilled hole 328C will provide for greater localized rib 324 flexibility or abradability than that of the rib material proximate hole 328A. In FIG. 34, the abradable component 330 includes support surface 331, to which is affixed ribs 332. The top surface 334 of the rib 332 has an array of varying-diameter holes 338A/B/C, which as shown increase diameter axially downstream from hole 338A to 338B to 338C along the hot working gas flow direction F. Generally, the wider drilled hole 338C will provide for greater localized rib 324 flexibility or abradability and lower cross sectional surface area than that of the rib material proximate hole 338A. Holes or depressions can be formed by any known abradable surface profiling method, including by way of non-limiting example laser pitting, water jet pitting or cutting or other erosive methods. While cylindrical profile, circular cross section holes 328A/B/C, and 338A/B/C are shown in FIGS. 33 and 34, other hole or depression polygonal profiles can be utilized. As shown in the embodiments of FIGS. 33 and 34 the respective ridges 322 and 332 start out as solid, monolithic surfaces on the upstream of left-most side of each figure, for greater hot working gas flow erosion resistance, and increase porosity axially downstream, toward the right-most side of each figure, for easier blade tip abradability and less blade tip wear.

Figure 6:
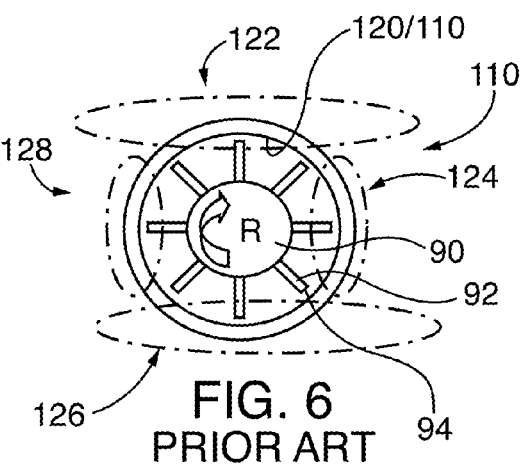
FIG. 6 is a radial cross sectional schematic view of a known turbine engine, highlighting circumferential zones that are more likely to create blade tip wear and zones that are less likely to create blade tip wear.

Multiple modes of blade depth intrusion into the circumferential abradable surface may occur in any turbine engine at different axial locations. Therefore, the abradable surface construction at any localized axial position about the surface circumference may be varied selectively to compensate for likely degrees of blade intrusion or hot working fluid gas (e.g., combustion gas or steam) erosion/spallation of the surface. For example, referring back to the typical known circumferential wear zone patterns of gas turbine engines 80 in FIGS. 3-6, the blade tip gap G at the 3:00 and 6:00 positions may be smaller than those wear patterns of the 12:00 and 9:00 circumferential positions. Anticipating greater wear at the 12:00 and 6:00 positions the lower ridge height $H_{RB}$ can be selected to establish a worst-case minimal blade tip gap G and the pixelated or other upper wear zone I ridge structure height $H_{RA}$, cross sectional width, and nib spacing density can be chosen to establish a small "best case" blade tip gap G in other circumferential positions about the turbine casing where there is less or minimal likelihood abradable component and case distortion that might cause the blade tip 94 to intrude into the abradable surface layer. Using the frangible ridges 472A of FIGS. 31 and 32 as an example, during severe engine operating conditions (e.g. when the engine is in fast start startup mode) the blade tip 94 impacts the frangible ridges 472A or 472A'—the ridges fracture under the high load increasing clearance at the impact zones only—limiting the blade tip wear at non optimal abradable conditions. Generally, the upper wear zone I ridge height in the abradable component can be chosen so that the ideal blade tip gap is 0.25 mm. The 3:00 and 9:00 turbine casing circumferential wear zones (e.g., 124 and 128 of FIG. 6) are likely to maintain the desired 0.25 mm blade tip gap throughout the engine operational cycles, but there is greater likelihood of turbine casing/abradable component distortion at other circumferential positions. The lower ridge height may be selected to set its ridge tip at an idealized blade tip gap of 1.0 mm so that in the higher wear zones the blade tip only wears deeper into the wear zone I and never contacts the lower ridge tip that sets the boundary for the lower wear zone II. If, despite best calculations and engine assembly, the blade tip continues to wear into the wear zone II, the resultant blade tip wear operational conditions are no worse than in previously known abradable layer constructions. However, in the remainder of the localized circumferential positions about the abradable layer the turbine is successfully operating with a lower blade tip gap G; thus at higher operational efficiency, with little or no adverse increased wear on the blade tips 94.

Figure 35:
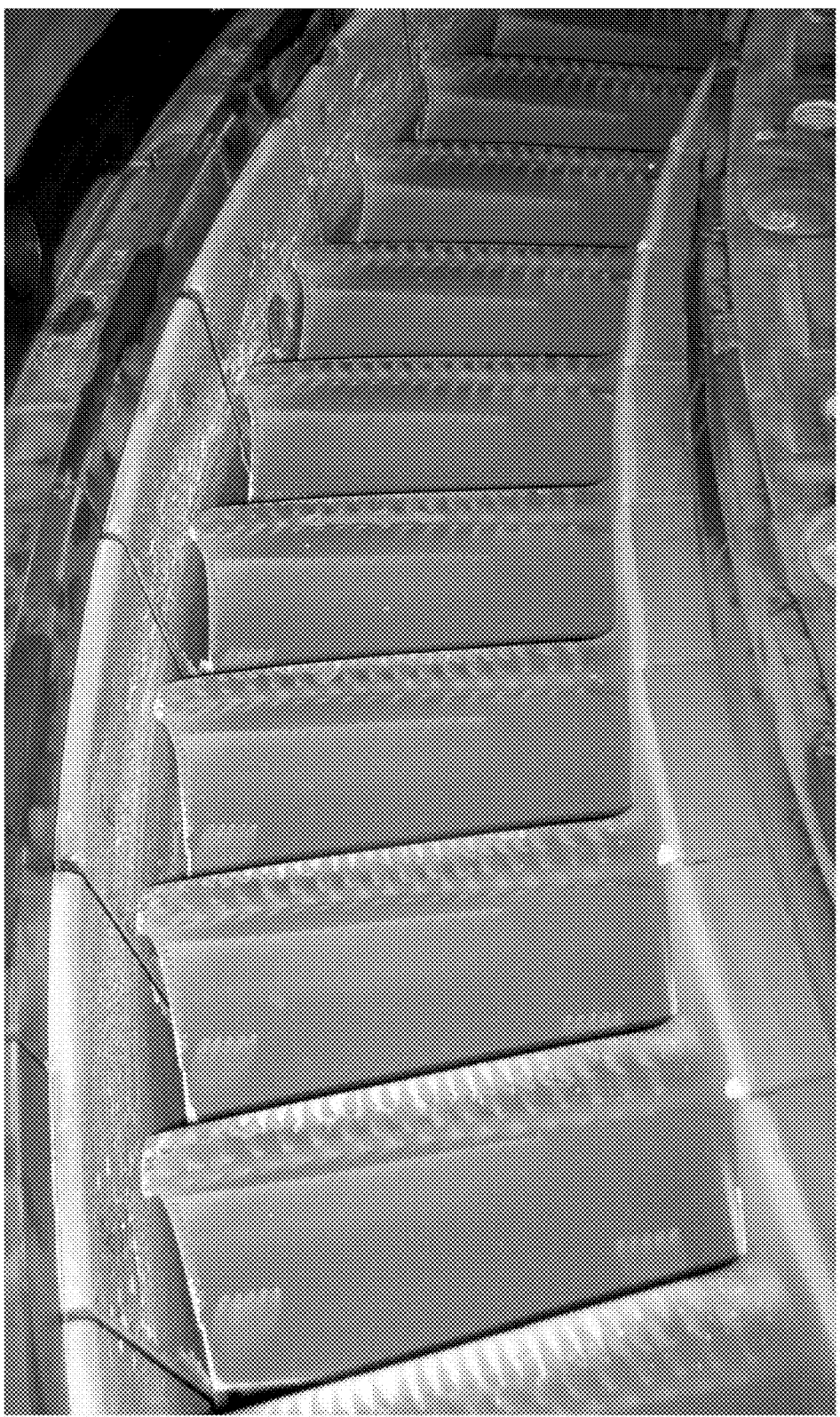
FIG. 35 is a perspective view photograph of a turbine engine ring segment or section taken in the direction F of FIGS. 1 and 2, showing surface erosion proximate the upstream axial end of the abradable surface.
Figure 36:
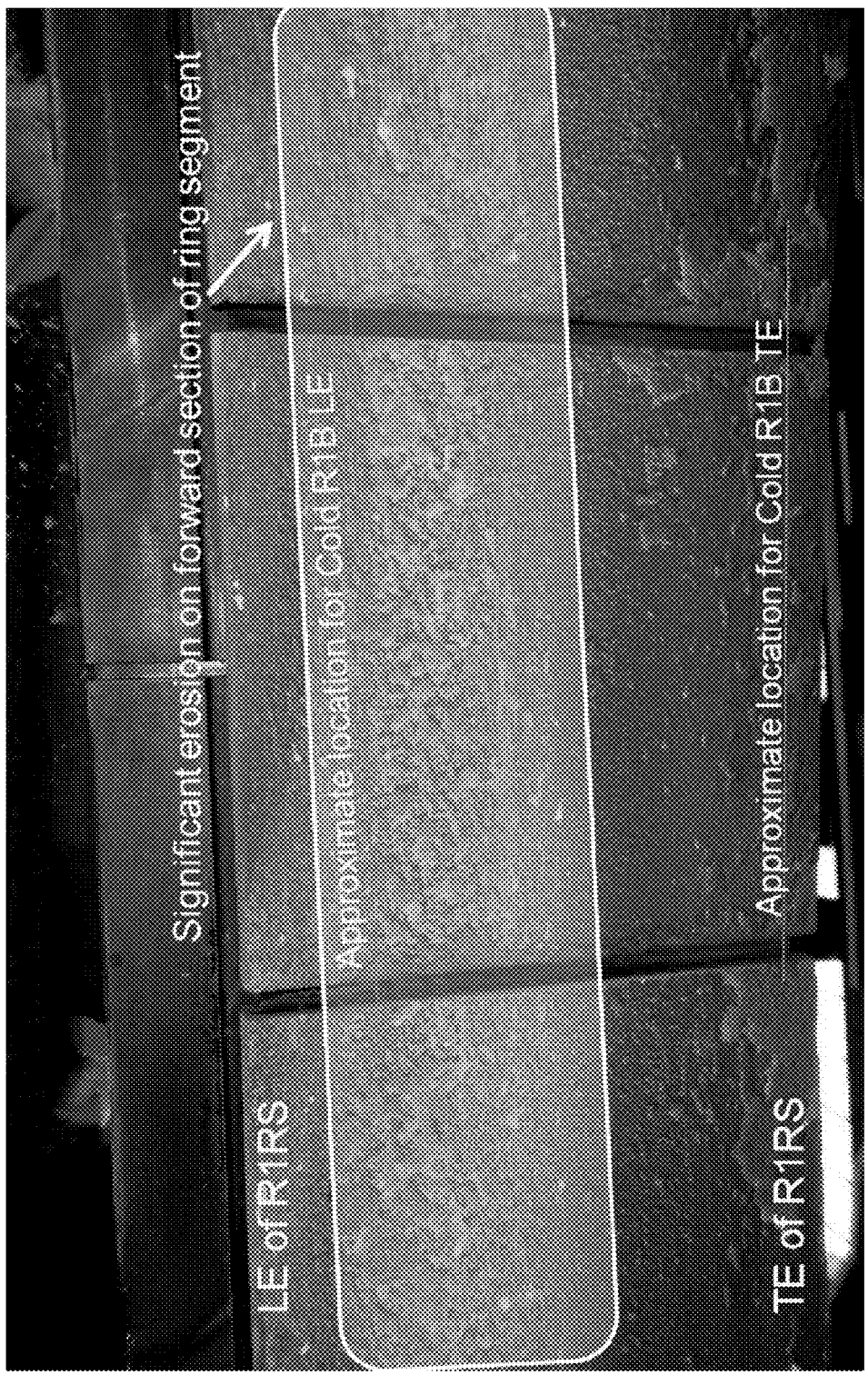
FIG. 36 is a plan view photograph of a turbine engine ring segment or section, taken in the P-P direction of FIG. 2, showing surface erosion proximate the upstream axial end of the abradable surface.
Figure 37:
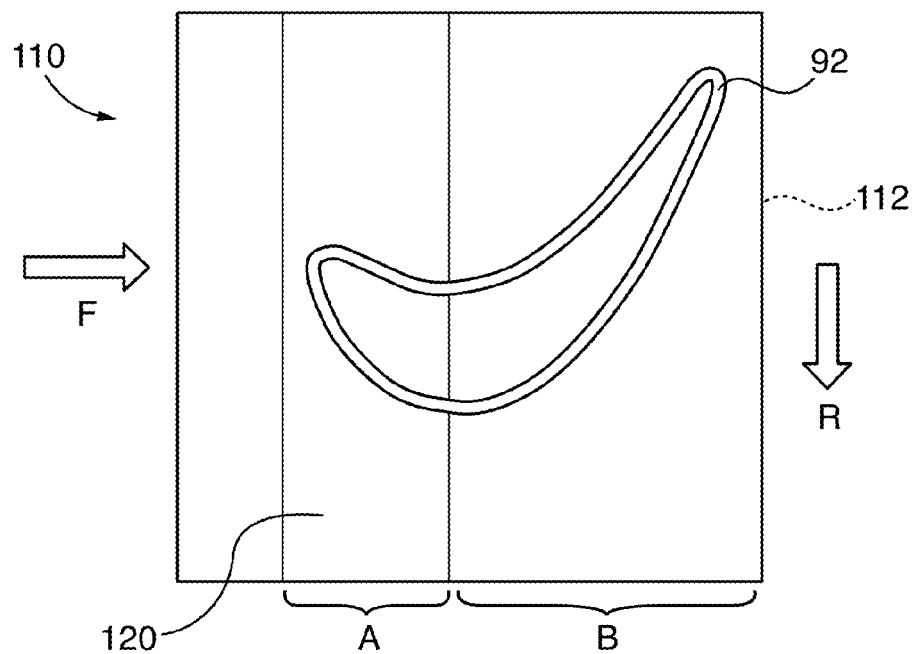
FIG. 37 is a schematic plan or plan form views of a turbine engine ring section, which maps axial wear zone regions in the abradable surface consistent with the photographs of FIGS. 35 and 36, and a schematic overlay of a turbine blade.

The photographs of FIGS. 35 and 36 show combustion turbine-engine stage 1, Row 1 ring segment abradable layer erosion caused by contact with hot working gas. The abradable surface in these photographs are of known, plain, axisymmetric, monolithic solid surface construction with no engineered surface feature grooves, ridges or other projecting portions that modify surface porosity or abradability. Erosion of the ring segment surface is undesirable: moderate erosion results in opening of operating blade tip gap, while severe erosion may lead to subsequent spallation of the abradable layer, with resultant decrease of thermal protection to the engine. Through inspection and empirical analysis, it has been determined that abradable surface erosion varies locally along its axial length. Referring to FIG. 37, abradable surface erosion/spallation wear tends to concentrate in the forward, upstream, one-third to one half axial length of the surface circumference (zone A), whereas less erosion/spallation occurs in the aft remaining axial length (zone B). Conversely, there is less blade tip incursion into the forward zone A abradable surface than in the aft zone B portion of the abradable surface. Embodiments described herein are optimized to resist erosion by providing a lower porosity abradable surface in zone A, while providing higher porosity abradable surface in zone B that reduces blade tip wear. Within zone B, empirical observation indicates that blade incursion increases axially downstream from the forward portion of the zone to the aft portion of the zone. In some embodiments, the abradable surface porosity and abradability is increased axially from the upstream to downstream side of zone B, as shown in the ridges 324 and 334, respectively in FIGS. 33 and 34, by increasing the depth of drilled holes 328A-328C and/or the diameter of the drilled holes 338A-338C.

Figure 38:
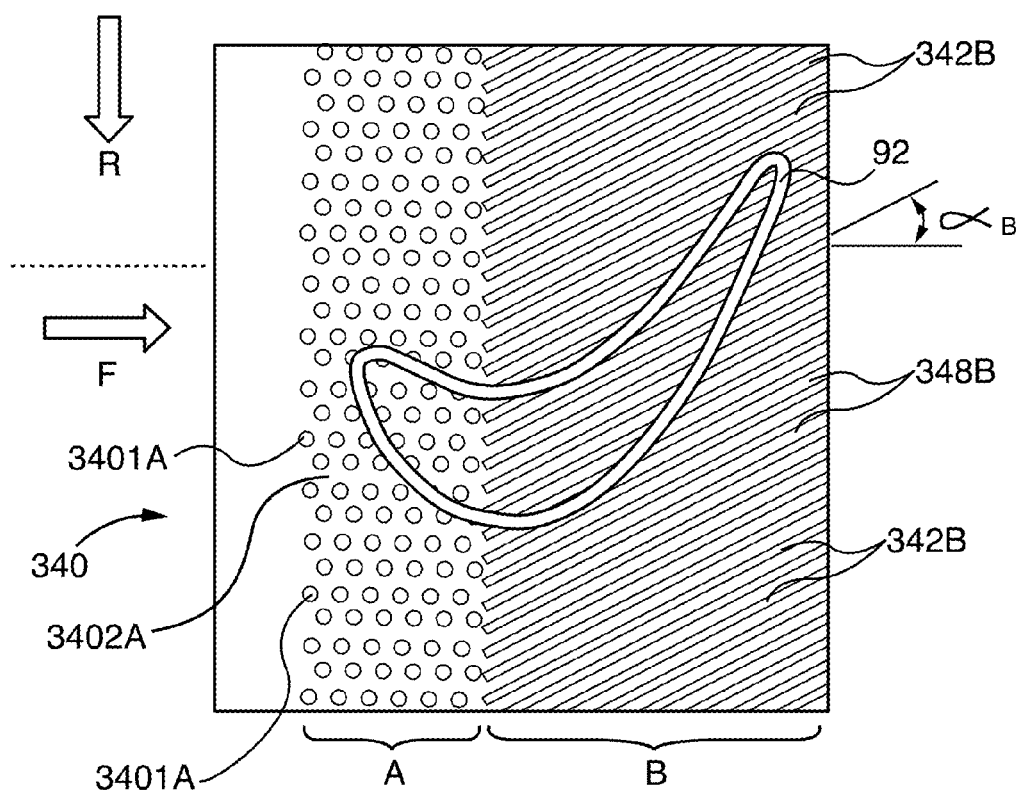
FIG. 38 is a plan or plan form view of a composite, non-directional orientation "dimpled" forward surface pattern, with an angled aft ridge and groove pattern, in accordance with an exemplary embodiment of the invention, and a schematic overlay of a turbine blade.

Composite Dimpled Forward Zone/Ridge and Groove Aft Zone Abradable Component Plan Forms The ring segment abradable component surface 340 plan form embodiment of FIG. 38 applies a targeted surface profiling to the engineered surface, by using a zonal system of forward (zone A) and rear or aft sections (zone B). The zone A profile comprises depression dimples 3401A, which are formed in the abradable surface. Alternatively, upwardly projecting surface feature dimples—deposited on the abradable surface or cut into the surface by excising material—can be formed in the forward zone A. The zone B profile comprises ridges 342B and grooves 348B, respectively. The dimples, ridges, and grooves, are locally tailored to meet the specific erosion/abradability and aerodynamic requirements of the ring segment. For example, the forward section or zone A needs more erosion protection than abradability qualities. Nevertheless, during worst-case engine operational transients (e.g. turbine warm restarting with fast loading) some abradable surface 340 incursion will occur over the entire blade 92 blade tip 94 chord (plan form "footprint"), so some higher level abradability within the forward zone than a monolithic, featureless continuous surface needs to be provided. Conversely, the rear section or zone B needs less erosion protection, but has a higher likelihood of blade rubbing during operation.

As previously noted, the abradable surface 340 forward section, zone A, has a non-directional array of depression dimples 3401A formed on the surface 3402A of the abradable ceramic material. Selectively forming the dimples 3401A on the forward section reduces the surface solidity in a controlled manner, to help increase abradability during blade tip 94 rubs, such as during the aforementioned "worst-case" engine restarting scenario. In addition, the dimples 342A create local vortices to help deter blade tip 94 leakage flow from pressure to suction side. In addition, using dimples (instead of ridges) can provide a generic forward section aerodynamic profiling to the abradable surface, compatible with different blade airfoil-camber profiles. Compare the Row 1 turbine blade 92 camber profile of FIGS. 39 and 40 to that of the Row 2 turbine blade 920 of FIGS. 41 and 42. Unlike the hockey stick-like abradable component 240 plan form profile of FIG. 22, where the forward zone A axial ridges 242A were optimized based on the blade 92 airflow incidence at full-speed, full-load design conditions, the array of depression dimples 324A of the abradable component 340 now are insensitive to flow conditions entering blade 92 and able to cope with engine partial-load and operational transients. The flow insensitive dimples 3401A are also compatible with the Row 2 turbine blade 920 of FIGS. 41 and 42. Thus, the dimpled forward zone A abradable surface feature design embodiments are compatible with multiple blade camber geometries and can be used universally in all blade rows of the turbine engine. The dimples 3401A are local surface features that do not form a distinct leakage path, hence are not expected to increase leakage L from the blade pressure to suction side. The depression dimple 3401A embodiment forms a less distinctive leakage path than comparable raised, vertically projecting dimples.

The rear section zone B does not have erosion issues and the rear portion of the blade tip 94 tends to rub deeper, and more frequently, into the component 340 surface: as previously noted the incursion tends to increase from the upstream side to the downstream side of zone B. Hence, axially downstream between zones A and B, the surface profile transitions from the dimples 3401A to the ridges 342B and grooves 348B that are slanted in the same orientation as the blade stagger, i.e., opposite the direction of blade rotation, and forming an angle $\alpha_B$ with respect to the turbine rotor rotational axis or the ring segment central axis. Ridge and groove angle $\alpha_B$ is selected in the angular range previously described with respect to the "hockey stick" abradable surface embodiments described herein: approximately 30% to 120% of the associated turbine blade 92 camber or trailing edge angle. Hot working gas flow will conform to the airfoil profile. Hence slanted ridges 242B are an effective way to improve blade tip 94 retention by reducing blade tip wear yet deter tip leakage. Compared to a plain, axisymmetric surface, the application of ridges 342B and grooves 348B in zone B essentially reduces the abradable component 340 surface cross sectional density and increases porosity. In turn, blade tip wear 94 reduces during rub events as less cutting force is required to remove the abradable material in the contact areas. Localized ridge 343B porosity can be further modified by incorporation of grooves within the ridge top surface (see, e.g., grooves 378A of FIG. 26 or grooves 388A of FIG. 27 or dimple depression holes 328A/B/C of FIG. 33 or depression holes 338A/B/C of FIG. 34). In some embodiments, the abradable surface 340 dimples 3401A and ridges 342B in the respective forward and rear sections are also discontinuous, to reduce the tendency for leakage in the blade gap G along the hot gas flow axial direction F within the grooves 348B. Discontinuities can be enhanced by incorporation of axial ridges across the entire zone A and B portions of the abradable plan form (see, e.g. the ridges 209 or 209A of FIG. 16, or the staggered ribs 343B of FIG. 22).

Non-Inflected, Bi-Angle, "Hockey Stick Abradable Component Plan Forms

Notwithstanding the universally applicable forward zone A dimpled engineered surface feature of the abradable component embodiment 340 of FIG. 38, in some applications it is preferable or desirable to utilize hockey stick-like ridges and groove patterns in both zones that are tailored for the airflow characteristics of a specific blade airfoil profile. The Row 2 blade profile of FIGS. 41 and 42 differs from the Row 1 blade profile of FIGS. 39 and 40. The abradable component 480 plan form in FIG. 43 is tailored to match the Row 2 blade 920 airflow characteristics. The abradable component 480 has a non-inflected, bi-angle hockey stick plan form wherein the plan form line-segment pattern of the grooves and ridges in the forward and aft zones are both angled in the same direction opposite the blade 920 rotation direction R. The first or forward angle $\alpha_A$ and second or aft angle $\alpha_B$ are defined relative to the support surface axis, which is oriented parallel to the corresponding turbine blade rotational axis (i.e., horizontally oriented from the upstream or left to downstream or right side of FIG. 43). The aft angle $\alpha_B$ is greater than the forward angle $\alpha_A$. In comparison, the previously described abradable layer hockey stick-like plan form patterns of FIGS. 12-19, 21, 22, and 30 defined forward zone A grooves and ridges generally parallel to the axial airflow direction F in the turbine casing, as in FIG. 1 (see, e.g., the abradable plan form pattern of component 240 of FIG. 22), or alternatively, roughly=+/−10% of the actual airflow direction relative to the turbine blade 92/blade tip 94 leading edge, with the aft angle $\alpha_B$ oriented opposite the corresponding turbine blade rotational direction R. As shown in FIG. 20, the previously described embodiments with the forward zone A plan form pattern, running generally parallel to the turbine blade rotational axis or the support surface axis, reduces tip rail leakage for Row 1 blades 92 of the type shown in FIGS. 39 and 40, where the general airflow entering Row 1, exiting the Row 1 vanes 104 remains generally parallel to both of the blade rotational axis and the component support axis.

Figure 39:
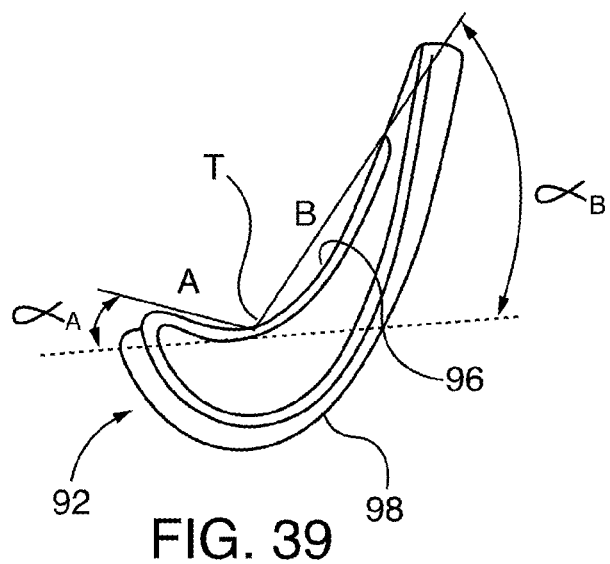
FIG. 39 is a plan view of an exemplary turbine blade tip for application in a gas turbine engine turbine section Row 1, such as with the "hockey stick" abradable surface of FIG. 22.
Figure 41:
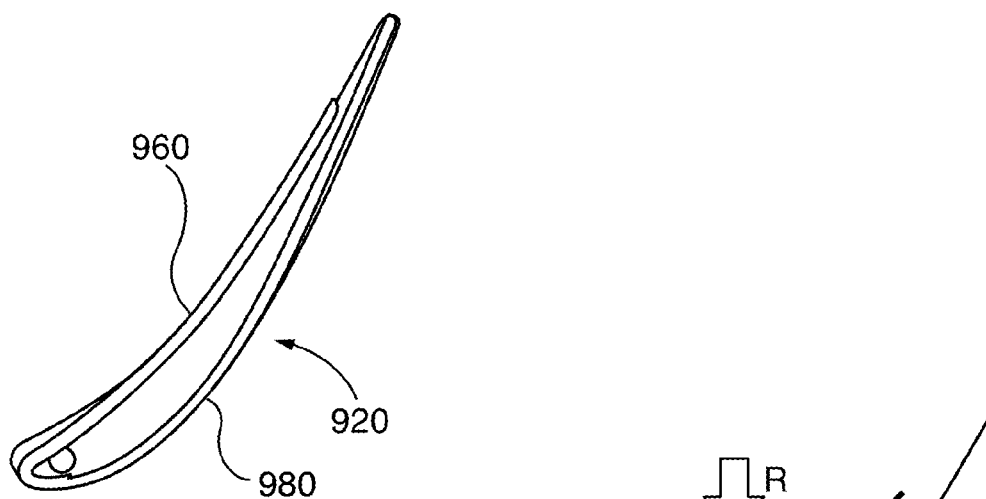
FIG. 41 is a plan view of another exemplary turbine blade tip for application in a gas turbine engine turbine section Row 2.
Figure 42:
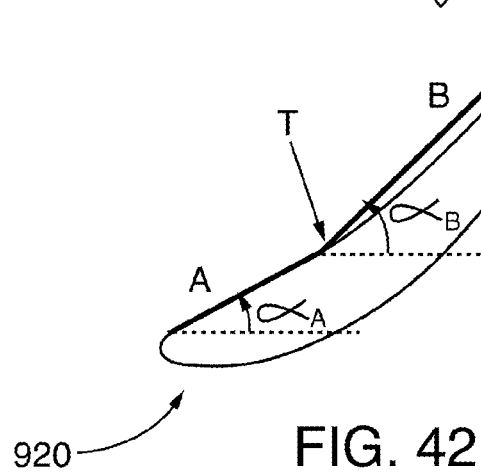
FIG. 42 is a schematic plan view of the turbine blade tip of FIG. 41, showing forward and aft angles relative to the mid-chord cutoff point on its pressure side concave surface.
Figure 40:
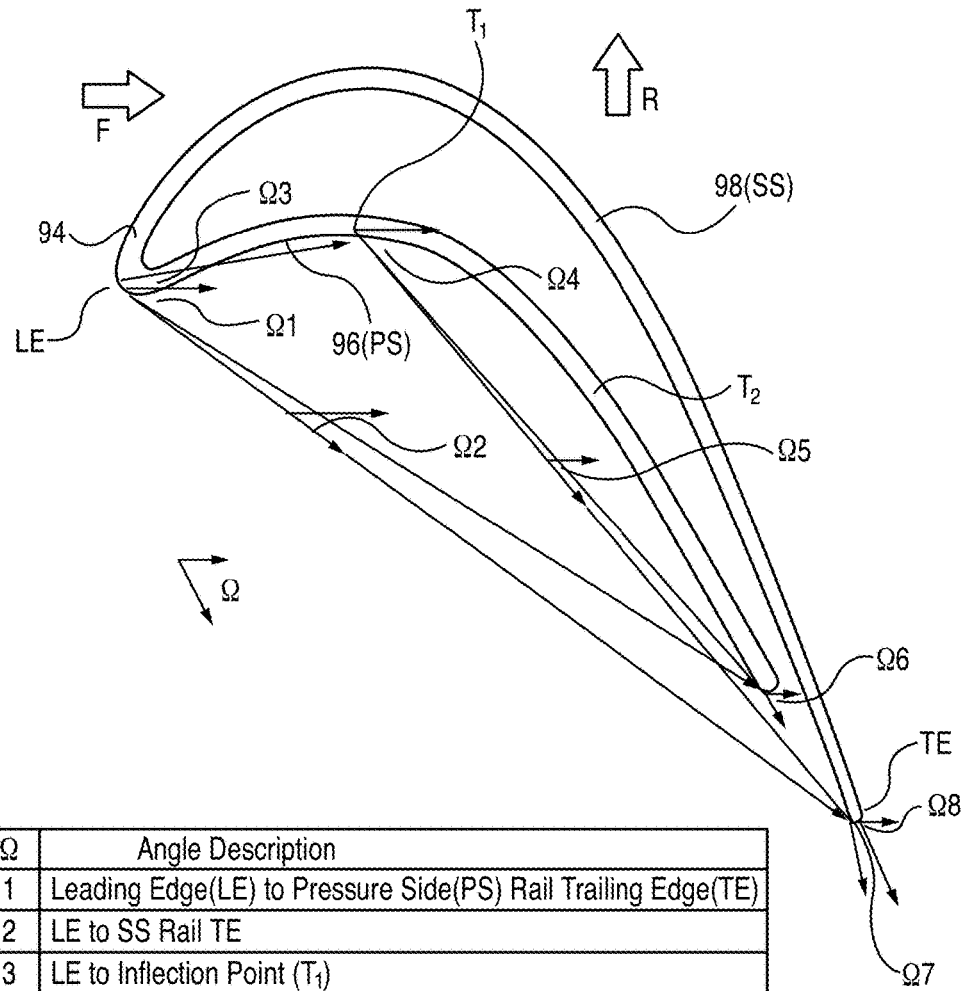
FIG. 40 is a detailed plan view of the exemplary turbine blade tip of FIG. 39, showing geometrical reference angles defined by the blade tip contour.
Figure 43:
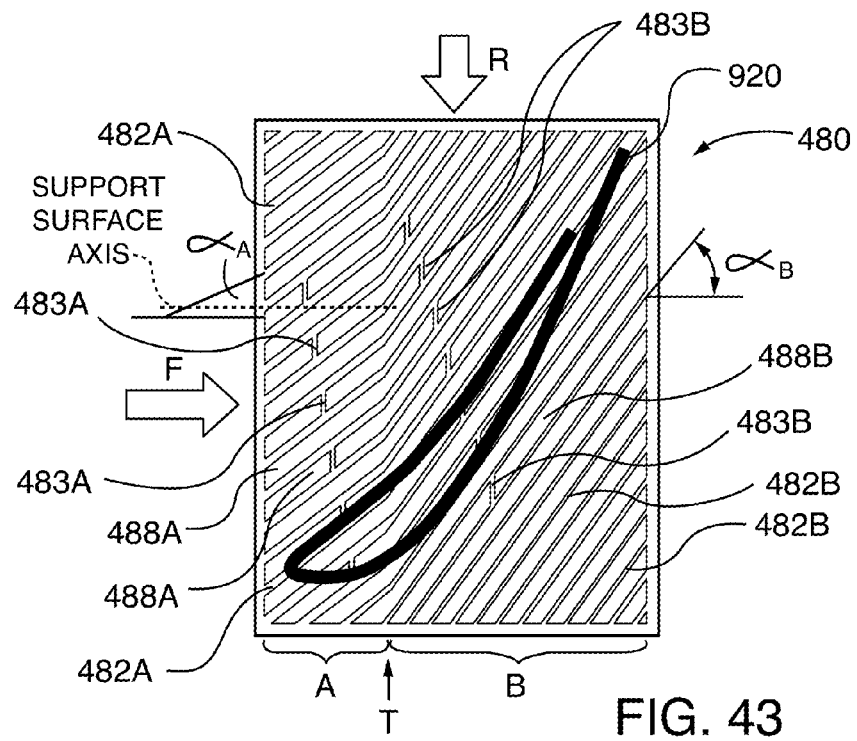
FIG. 43 is a plan or plan form view similar to that of FIG. 22 of a composite, non-inflected, bi-angle, "hockey stick" like pattern abradable surface ridges and grooves, which includes vertically oriented ridge arrays that are laterally staggered across the abradable surface in the turbine engine's axial flow direction, with a schematic overlay of the turbine blade tip of FIGS. 41 and 42.

Sequentially downstream Row 2 blades, such as the blade 920 of FIGS. 41 and 42 have non-inflected (i.e., pointing in the same direction) forward angle $\alpha_A$ that transitions to adjoining aft angle $\alpha_B$, both of which are oriented opposite blade rotation direction. More specifically angle $\alpha_A$ is defined between the blade leading edge to its mid chord cutoff point T on its pressure side concave surface and angle $\alpha_B$ originates from the cutoff point T to the blade trailing edge. In comparison, the Row 1 blade 92 has inflected, chevron-shaped intersecting angles $\alpha_A$ and $\alpha_B$ in its respective zones A and B, such as shown in FIGS. 39 and 40.

The abradable component 480 hockey stick like plan form pattern of FIG. 43 combines the embodiment concepts of distinct forward zone A and aft zone B respective ridge 482 AB and groove 488A/B patterns that intersect at an axially-positioned transition T. The abradable pattern transition T is opposite from, and corresponds to the radial projection of the rotating blade 920 mid-chord cutoff point T where the angle increases from $\alpha_A$ to $\alpha_B$. Compared to the abradable component 230 of FIG. 21, there is no equivalent structure to the vertical ridge 239 that splits the zones A and B from each other. Thus the grooves 488A/B form a continuous composite groove from the leading or forward edge of the abradable component 480 to its aft most downstream edge (see flow direction F arrow) that is covered by the axial sweep of the corresponding turbine blade 920 squealer blade tip 940. The staggered vertical ridges 483A/B interrupt axial flow through each groove without potential continuous abrasion contact between the abradable surface and a corresponding rotating blade (in the direction of rotation arrow R) at one single axial location, as occurs with a continuous vertical ridge. Beneficially, the relatively long runs of continuous straight line grooves 488A/B, interrupted only periodically by small vertical ridges 483 A/B, provide for ease of manufacture by water jet erosion or other known manufacturing techniques. The abradable component 480 embodiment offers a good subjective design compromise among airflow performance, blade tip wear and manufacturing ease/cost in a bi-angle plan form application as does the single angle plan form application of FIG. 22.

Figure 44:
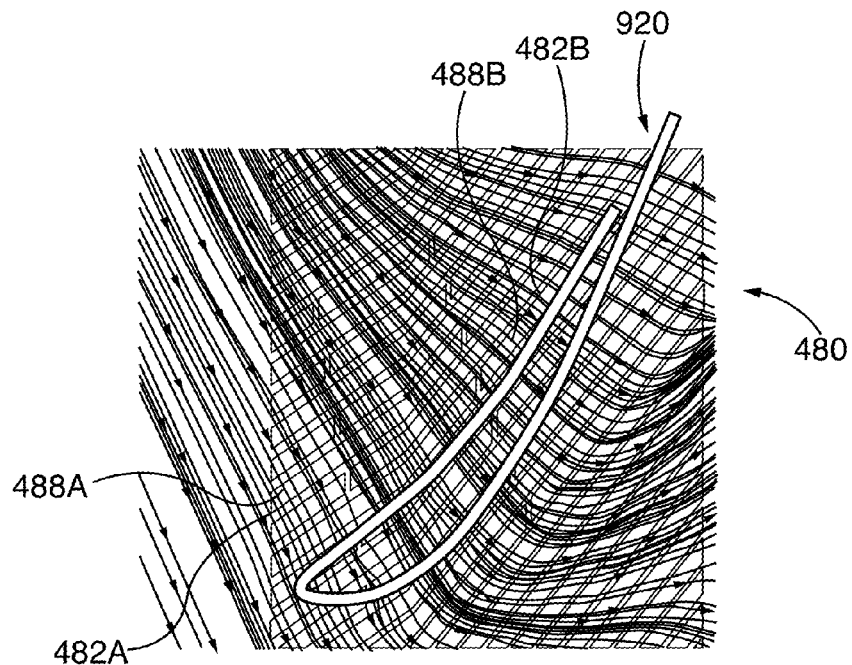
FIG. 44 is a blade tip leakage streamline simulation of the paired turbine blade tip of FIG. 41 and the composite, non-inflected, bi-angle, "hockey stick" like pattern abradable surface of FIG. 43.

As shown in the stationary frame streamline schematic view of FIG. 44, the non-inflected, bi-angle ridge 483A/B and groove 488A/B plan form pattern is oriented perpendicular to airflow in the blade 920 tip gap, resulting in less flow inside the grooves 488A/B than would be likely if the alternative hockey-stick abradable pattern of FIG. 22 were utilized in the Row 2 application. In the abradable component 480 embodiment of FIGS. 43 and 44, the suggested range of forward angles $\alpha_A$ is approximately 80% to 120% of the associated blade 920 angle $\alpha_A$ from the blade tip leading edge to the cutoff point T or approximately 30 to 45 degrees relative to the support surface axis. The range of aft angles $\alpha_B$ is approximately 80% to 120% of the associated turbine blade 920 angle $\alpha_B$ from the cutoff point to the trailing edge or approximately 45 to 60 degrees relative to the support surface axis.

The non-inflected, bi-angle ridge and groove plan form pattern of FIGS. 43 and 44 can be combined jointly or severally with other hockey stick embodiment plan form patterns previously described herein. For example while the adjoining fore and aft pattern ridges and grooves of FIG. 43 are contiguously aligned uniform features across the abradable component from the upstream to downstream side, they may be alternatively aligned in staggered fashion, such as by varying width or pitch on both sides of the transition T as shown and described herein with reference to FIG. 16 or 17. The contiguous ridges 482A/B and grooves 488A/B of FIG. 43 have different widths on both sides of the transition T. The component embodiment 480 grooves 488A/B can be blocked by transverse ridges spanning the groove, corresponding to the component 460 transverse ridges 463A/B, of FIG. 30.

The abradable component embodiment of FIG. 43 plan form surface can define patterns of axially aligned or rotationally aligned spacer ridges or both, such as the axially aligned or horizontal spacer ridges 169 of FIG. 12 or the vertical ridge 229 of FIGS. 18/19, for periodically blocking corresponding turbine blade tip leakage as the blade tip rotates about the abradable surface. The component embodiment 480 of FIG. 43 has contiguous ridges 482A/B and grooves 488A/B, it can incorporate patterns of sub-ridges or sub-grooves that in combination are aligned to form composite fore and aft ridge and groove plan form patterns, such as the patterns 222A/223A/228A or 222B/223B/228B, which are shown in the embodiments of FIGS. 18/19, (or the alternative corresponding structures of FIG. 21). While FIG. 43 shows single-height ridges and grooves, any of the other ridge and groove variable topography features described herein with respect to other embodiments can be incorporated into the non-inflected, bi-angle plan form patterns of FIGS. 43 and 44. For example, the multi-height ridges and grooves of exemplary alternative embodiment abradable component 460 of FIG. 30 can be utilized in the plan form pattern of FIG. 43, in order to facilitate fast start mode engine construction, as well as trapezoidal cross sectional grooves 148 and ridges 152 of FIG. 42.

Triple-angle, "Hockey Stick Abradable Component Plan Forms

Figure 45:
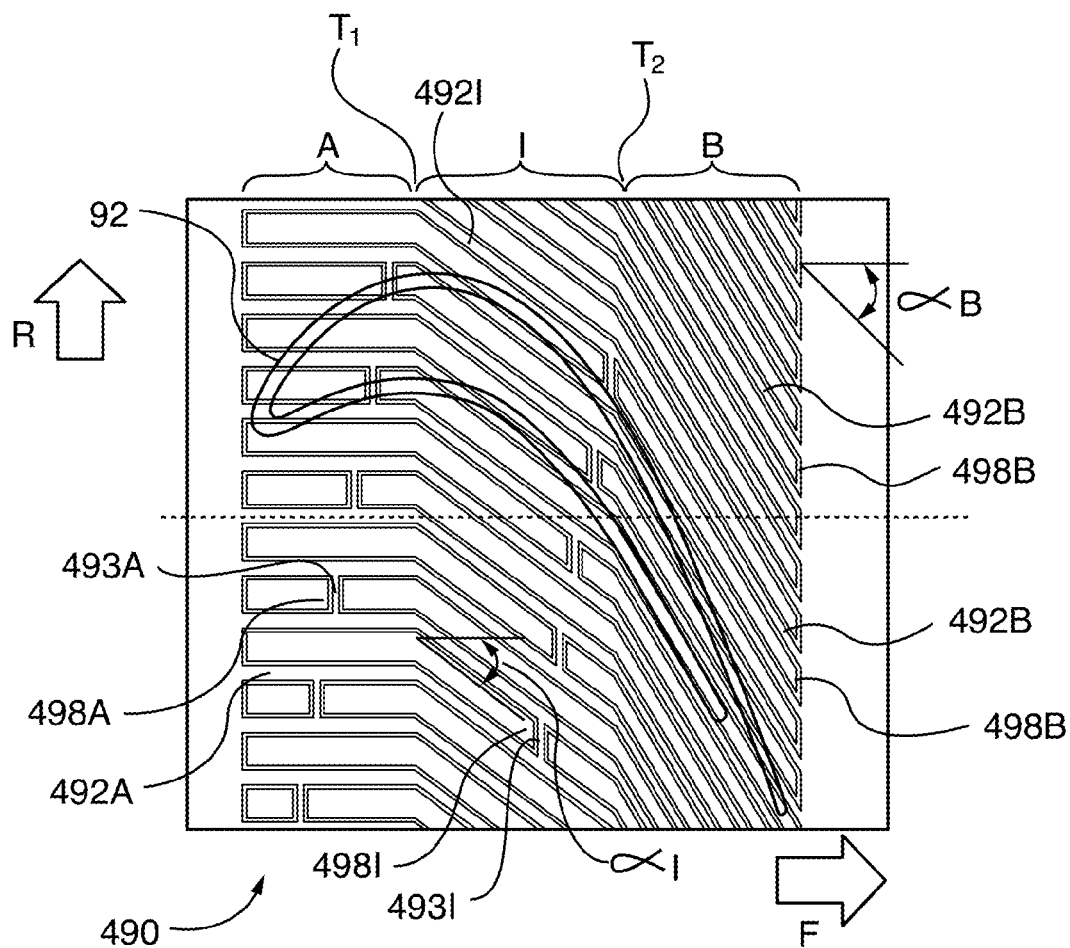
FIG. 45 is a plan or plan form view of a composite, tri-angle "hockey stick" like pattern abradable surface ridges and grooves, which includes vertically oriented ridge arrays that are laterally staggered across the abradable surface in the turbine engine's axial flow direction, in accordance with an exemplary embodiment of the invention, which includes a schematic overlay of the turbine blade tip of FIGS. 39 and 40.

FIG. 45 shows an abradable component 490, with a triple-angle, or "tri-angle" plan form pattern or ridges 492A/I/B and grooves 498A/I/B. The triple-angle ridge and groove pattern is defined by two inflection points $T_1$ and $T_2$, which correspond in axial position to the respective counterpart inflection points $T_1$, $T_2$ on the turbine-blade pressure side (PS) tip rail 96 of FIG. 40.

The first inflection point $T_1$ is at the tangent point of the pressure side rail and roughly ⅓ of the pressure side tip rail 96 length from the leading edge. More specifically, in some embodiments the first inflection point $T_1$ is defined between the leading edge and the mid-chord of the blade 92 airfoil at a cutoff point where a line parallel to the turbine 80 axis is roughly in tangent to the concave pressure side (PS) surface 96 of the airfoil. As previously noted, the turbine axis 80 is concentric with the central axis of curvature of the ring segment 112, both of which are also perpendicular to the forward axial edge of the ring segment and the abradable component 120.

The second inflection point $T_2$ is roughly ⅔ of the pressure side rail from the leading edge. More specifically, in some embodiments the second inflection point $T_2$ is defined as initiation of a tangent line to the trailing edge, which is the trailing edge (TE) angle Ω6 of the airfoil pressure-side surface 96.

The plan form of the abradable surface 490 array ridge and groove pattern comprises the axially adjoining forward zone A, the intermediate zone I and the aft zone B. Forward zone A originates proximate the front axial edge of the abradable surface 490 and terminates at the first inflection point $T_1$; it is generally parallel to the central axis of curvature of the ring segment 112, or perpendicular to the abradable surface front axial edge. The intermediate zone I is between the first and second inflection points $T_1$ and $T_2$, downstream of zone A. The aft zone B is downstream of the intermediate zone I, originating at the second inflection point $T_2$ and terminating proximate the aft axial edge of the abradable surface 490. In some embodiments, the forward zone A angle $\alpha_A$ is perpendicular to the forward axial edge of the abradable component 490, comparable to the hockey stick profile of the abradable component 240 of FIG. 22. In some embodiments, the aft zone B angle $\alpha_B$ matches the trailing edge (TE) angle S26 of the airfoil pressure-side surface 96 of FIG. 40. In some embodiments, the zone I angle matches the angle of the ridge 4921 and groove 4981 segments, which connect and are contiguous with the corresponding forward zone A and aft zone B ridges and grooves. It is noted that the zone I and zone B ridges and groove segments are generally similar to those of the bi-angle abradable component plan form 480 of FIG. 43, with the non-inflecting angles $\alpha_1$ and $\alpha_B$, which are oriented opposite the blade 92 rotation direction R.

The triple-angle ridge and groove plan form pattern of FIG. 45 can be combined jointly or severally with other hockey stick embodiment plan form patterns previously described herein. For example while the axially adjoining fore and aft pattern ridges and grooves of FIG. 45 are contiguously aligned uniform features across the abradable component from the upstream to downstream side, they may be alternatively aligned in staggered fashion, such as by varying width or pitch on either or both sides of the transitions $T_1$ and $T_2$, as shown and described herein with reference to FIG. 16 or 17. The contiguous ridges 492A/I/B and grooves 498A/I/B of the FIG. 45 embodiment have different widths on both sides of the transitions $T_1$ and $T_2$. The component embodiment 490 grooves 488A/I/B can be blocked by transverse ridges 493 spanning the groove, corresponding to the component 460 transverse ridges 463A/B, of FIG. 30.

In some embodiments, the abradable component 490 of FIG. 45 plan form surface can define patterns of axially aligned or rotationally aligned spacer ridges or both, such as the axially aligned or horizontal spacer ridges 169 of FIG. 12 or the vertical ridge 229 of FIGS. 18/19, for periodically blocking corresponding turbine blade tip leakage as the blade tip rotates about the abradable surface. The component embodiment 490 of FIG. 45 has contiguous ridges 492A/I/B and grooves 498A/I/B, but it can incorporate patterns of sub-ridges or sub-grooves that in combination are aligned to form composite fore and aft ridge and groove plan form patterns, such as the patterns 222A/223A/228A or 222B/223B/228B, which are shown in the embodiments of FIGS. 18/19, (or the alternative corresponding structures of FIG. 21). While FIG. 45 shows single-height ridges and grooves, any of the other ridge and groove variable topography features described herein with respect to other embodiments can be incorporated into the triple-angle plan form pattern of FIG. 45. For example, the multi-height ridges and grooves of exemplary alternative embodiment abradable component 460 of FIG. 30 can be utilized in the plan form pattern of FIG. 45, in order to facilitate fast start mode engine construction.

Figure 46:
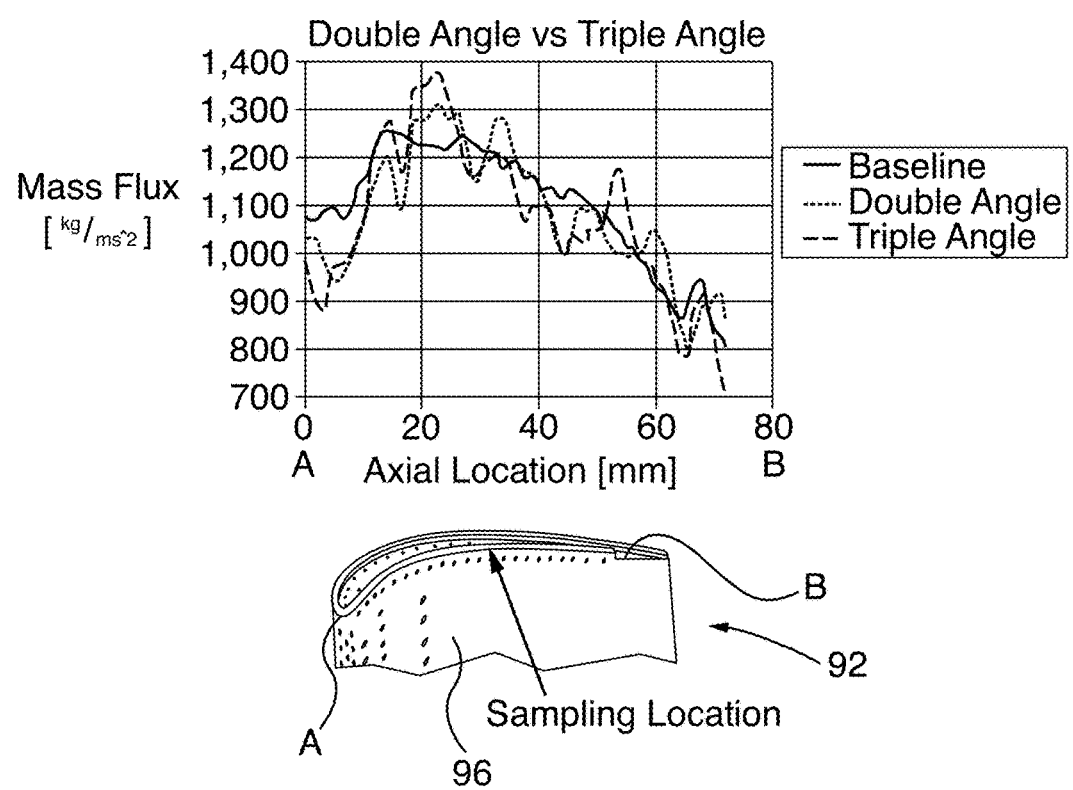
FIG. 46 is a comparison graph of simulated blade tip leakage mass flux from leading to trailing edge for the respective FIG. 45 tri-angle "hockey stick" like pattern abradable surface ridges and grooves, the double-angle "hockey stick" abradable pattern similar to that of FIG. 22, and a featureless "baseline" abradable surface.

FIG. 46 shows computational fluid dynamic (CFD) analysis comparisons of blade 92 (FIGS. 39 and 40) tip leakage L between the "double-angle" hockey-stick-like abradable surface 240 of FIG. 22 and the triple-angle abradable surface 490 of FIG. 45, compared to a baseline, featureless (continuously flat) abradable surface. The triple-angle abradable surface 490 has a greater tip-leakage flow reduction than the double-angle abradable surface 240. CFD analysis has been performed to compare the Mach number distribution inside the grooves 248A/B and 498 A/I/B of the respective abradable surfaces 240 and 490. The Mach number inside the triple-angle grooves 498 A/I/B is lower than the Mach number inside the grooves 248A/B, indicating a lower tip leakage flow.

Although various embodiments that incorporate the teachings of the invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. For example, various ridge and groove profiles may be incorporated in different plan form arrays that also may be locally varied about a circumference of a particular engine application. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted", "connected", "supported", and "coupled" and variations thereof are used broadly and encompass direct and indirect mountings, connections, supports, and couplings, unless otherwise specified. Further, "connected" and "coupled" are not restricted to physical or mechanical connections or couplings.

What is claimed is:

1. A turbine engine ring segment component, adapted for coupling to an interior circumference of a turbine casing in opposed orientation with a rotating turbine blade tip circumferential swept path, the blade tip having a rotational direction, a leading edge, a mid-chord cutoff point on its pressure side concave surface and a trailing edge, the component comprising:

a curved support surface adapted for coupling to a turbine casing inner circumference, the support surface having upstream and downstream axial ends and a support surface curvature radius defined by a support surface central axis;

an abradable substrate coupled to the support surface, having a substrate surface facing the support surface central axis, the substrate surface defining a forward zone originating nearer the support surface upstream end and terminating axially between the support surface ends, and the substrate surface defining an aft zone originating at the adjoining forward zone termination and terminating axially nearer the support surface downstream end;

the forward zone defining a plan form pattern of projection or indentation dimples facing the support surface central axis, the dimples respectively having cross sectional profiles, for selectively varying hot working gas erosion resistance, porosity and/or abradability thereof, the dimples further having increasing volumes axially along the abradable surface from proximate the upstream axial end of the support surface to proximate the downstream axial end of the support surface;

the aft zone defining a plan form pattern of grooves and vertically projecting ridges facing the support surface central axis, angularly oriented at a first forward angle transverse to the support surface central axis;

the respective forward zone dimple pattern enhancing higher hot working gas erosion resistance than in the aft zone; and the respective aft zone ridge and groove pattern enhancing greater porosity and abradability than in the forward zone.

2. The component of claim 1, the forward zone dimples having varying cross sectional profile, for varying dimple volume.

3. The component of claim 1, the forward zone dimples having varying projection height or indentation depth, for varying dimple volume.

4. The component of claim 1, the forward zone dimple pitch spacing varying along the abradable surface.

5. The component of claim 1, the forward zone dimples comprising indentation dimples formed in an otherwise monolithic, featureless abradable surface.

6. The component of claim 5, the forward zone comprising approximately one-third of the abradable surface axial length between the support surface axial ends.

7. The component of claim 1, the forward zone comprising approximately one-third of the abradable surface axial length between the support surface axial ends.

8. The component of claim 1, the aft downstream zone groove and ridge pattern oriented between approximately 45 to 60 degrees relative to the support surface central axis.

9. A turbine engine, comprising:
a turbine housing including a turbine casing interior circumference;
a rotor having blades rotatively mounted in the turbine housing along a turbine blade rotational axis, distal tips of which forming a blade tip circumferential swept path in the blade rotation direction and axially with respect to the turbine casing interior circumference, each turbine blade having a leading edge, a mid-chord cutoff point on its pressure side concave surface and a trailing edge, oriented at a trailing edge angle relative to turbine blade rotational axis; and
a ring segment component having:
a curved support surface adapted for coupling to a turbine casing inner circumference, the support surface having upstream and downstream axial ends and a support surface curvature radius defined by a support surface central axis;
an abradable substrate coupled to the support surface, having a substrate surface facing the support surface central axis, the substrate surface defining a forward zone originating nearer the support surface upstream end and terminating axially between the support surface ends, and the substrate surface defining an aft zone originating at the adjoining forward zone termination and terminating axially nearer the support surface downstream end;

the forward zone defining a plan form pattern of projection or indentation dimples facing the support surface central axis, the dimples respectively having cross sectional profiles, for selectively varying hot working gas erosion resistance, porosity and/or abradability thereof, the dimples further having increasing volumes axially along the abradable surface from proximate the upstream axial end of the support surface to proximate the downstream axial end of the support surface;

the aft zone defining a plan form pattern of grooves and vertically projecting ridges facing the support surface central axis, angularly oriented at a first forward angle transverse to the support surface central axis and opposite corresponding turbine blade rotational direction;

the respective forward zone dimple pattern enhancing higher hot working gas erosion resistance than in the aft zone; and the respective aft zone ridge and groove pattern enhancing greater porosity and abradability than in the forward zone.

10. The turbine engine of claim 9, the forward zone having axial length defined between approximately one-third and one-half of a corresponding turbine blade airfoil axial length, and the aft zone defining remaining axial length between the support surface axial ends.

11. The turbine engine of claim 10, the forward zone axial length terminating opposite axial position of the turbine blade mid-chord cutoff, and the aft zone defining remaining axial length between the support surface axial ends.

12. The turbine engine of claim 9, the forward zone dimples having varying cross sectional profile, for varying dimple volume.

13. The turbine engine of claim 9, the forward zone dimples comprising indentation dimples formed in an otherwise monolithic, featureless abradable surface.

14. The turbine engine of claim 13, the forward zone axial length terminating opposite axial position of the turbine blade mid-chord cutoff, and the aft zone defining remaining axial length between the support surface axial ends.

15. A method for enhancing operational service life of a turbine engine, comprising:
providing a turbine engine, having:
a turbine housing including a turbine casing interior circumference;
a rotor having blades rotatively mounted in the turbine housing along a turbine blade rotational axis, distal tips of which forming a blade tip circumferential swept path in the blade rotation direction and axially with respect to the turbine casing interior circumference, each turbine blade having a leading edge, a mid-chord cutoff point on its pressure side concave surface and a trailing edge, oriented at a trailing edge angle relative to turbine blade rotational axis; and
a ring segment component having:
a curved support surface adapted for coupling to a turbine casing inner circumference, the support surface having upstream and downstream axial ends and a support surface curvature radius defined by a support surface central axis;
an abradable substrate coupled to the support surface, having a substrate surface facing the support surface central axis, the substrate surface defining a forward zone originating nearer the support surface upstream end and terminating axially between the support surface ends, and the substrate surface defining an aft zone originating at the adjoining forward zone termination and terminating axially nearer the support surface downstream end;

forming in the forward zone a plan form pattern of projection or indentation dimples facing the support surface central axis, the dimples respectively having cross sectional profiles, the dimples further having increasing volumes axially along the abradable surface from proximate the upstream axial end of the support surface to proximate the downstream axial end of the support surface; and forming in the aft zone a plan form pattern of grooves and vertically projecting ridges facing the support surface central axis, angularly oriented at a first forward angle transverse to the support surface central axis and opposite corresponding turbine blade rotational direction, for selectively varying hot working gas erosion resistance, porosity and/or abradability thereof;

the respective forward zone dimple pattern enhancing higher hot working gas erosion resistance than in the aft zone and the respective aft zone ridge and groove pattern enhancing greater porosity and abradability than in the forward zone.

16. The method of claim 15, further comprising:

terminating the forward zone axial length opposite axial position of the turbine blade mid-chord cutoff;

forming the forward zone abradable surface as a monolithic, featureless surfaces with no indentations; and forming the forward zone dimples as indentations in the forward zone abradable surface, selectively varying indentation pitch spacing and/or indentation volume axially along the abradable surface.

* * * * *